United States Patent
Yoshimura et al.

[11] Patent Number: 5,606,174
[45] Date of Patent: Feb. 25, 1997

[54] METHOD AND DEVICE FOR DETECTING A SHAPE OF OBJECT WITH HIGH RESOLUTION MEASUREMENT OF DISPLACEMENT OF AN OBJECT SURFACE FROM A REFERENCE PLANE

[75] Inventors: Kazunari Yoshimura; Kuninori Nakamura; Katsuji Komaki, all of Kadoma, Japan

[73] Assignee: Matsushita Electric Works, Ltd., Osaka, Japan

[21] Appl. No.: 434,345

[22] Filed: May 2, 1995

[30] Foreign Application Priority Data

May 26, 1994 [JP] Japan ................................ 6-113167

[51] Int. Cl.$^6$ ........................................... G01N 21/86
[52] U.S. Cl. ............................... 250/559.22; 356/376
[58] Field of Search ........................ 250/559.22, 559.4, 250/559.25, 559.32; 356/376, 377, 380; 382/273, 274

[56] References Cited

U.S. PATENT DOCUMENTS

| | | | |
|---|---|---|---|
| 3,794,262 | 12/1988 | Sato et al. | 356/376 |
| 4,939,379 | 7/1990 | Horn | 356/376 |
| 5,135,309 | 8/1992 | Kuchel et al. | 356/376 |
| 5,444,537 | 8/1995 | Yoshimura et al. | 356/376 |
| 5,473,436 | 12/1995 | Fukazawa | 356/376 |

*Primary Examiner*—Que T. Le
*Attorney, Agent, or Firm*—Burns, Doane, Swecker & Mathis. L.L.P.

[57] ABSTRACT

An arrangement for detecting a shape of object to measure any displacement of its surface from a reference plane with a high resolution, and to improve to precision of the measurement. This is attained by irradiating a projected light beam from a light source on a subject the light beam being deflected by a vibration mirror and passed through a light projecting lens for scanning projected light spots, by providing a light receiving lens with its optical axis within a scanning plane of the projected light beam while arranging first photosensors on an image plane of the light receiving lens for detection of the position of the projected light beam with the first photosensors, and obtaining with a distance operator a time difference between a first time when an image of a spot with respect to the subject to detect passes through any one of the first photosensors and a second time when the projected light beam passes through one of second photosensors provided to set a reference plane and corresponding to one of the first photosensors upon irradiation of the projected light beam upon the reference plane, for conversion of this time difference into a displacement of the surface of the subject to detect with respect to the reference plane.

19 Claims, 16 Drawing Sheets

100% ← 0%

100% ← 0%

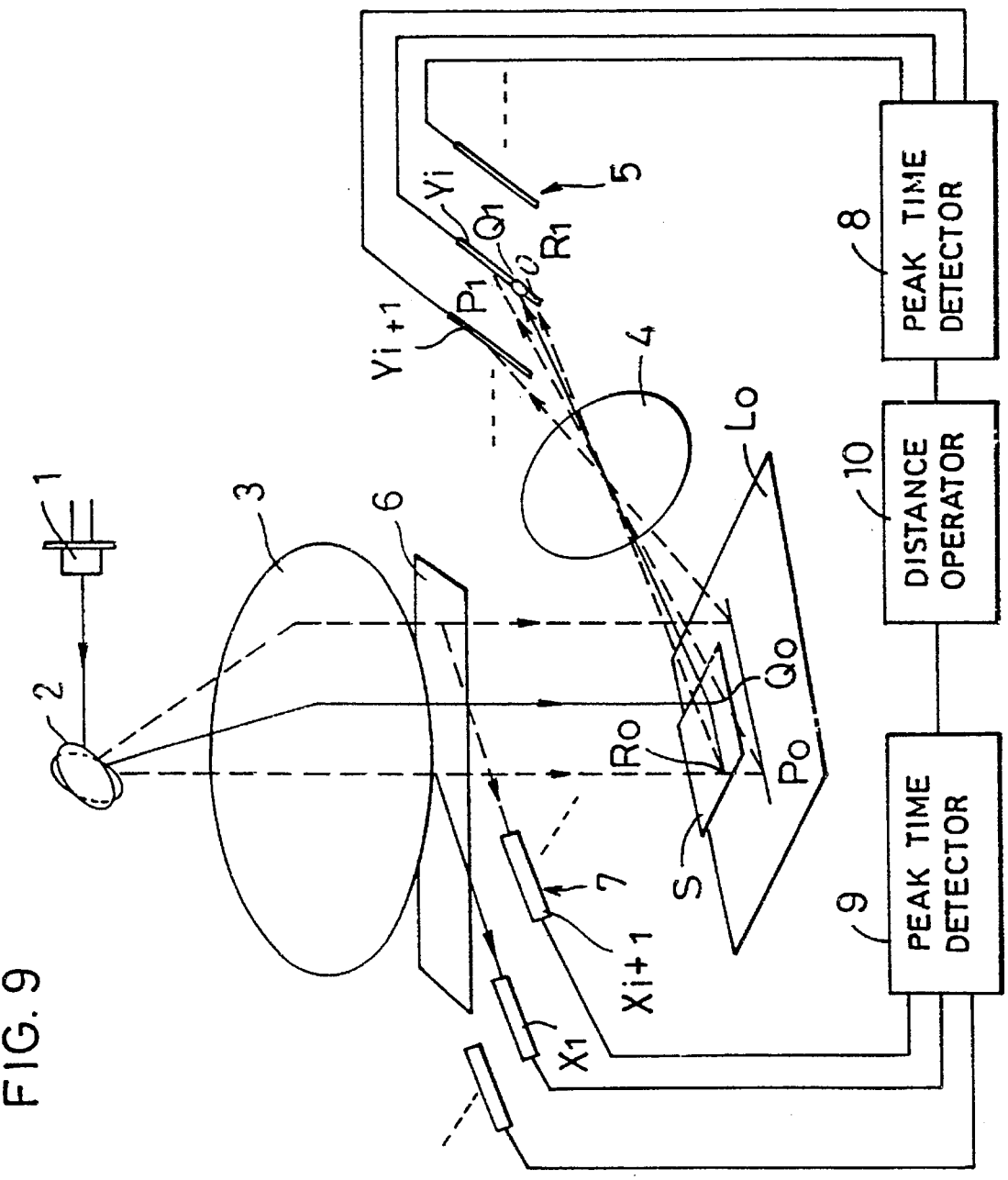

METHOD AND DEVICE FOR DETECTING A SHAPE OF OBJECT WITH HIGH RESOLUTION MEASUREMENT OF DISPLACEMENT OF AN OBJECT SURFACE FROM A REFERENCE PLANE

BACKGROUND OF THE INVENTION

This invention relates to a method and a device for detecting the shape of a subject to be detected through a measurement of a displacement of the subject from a reference plane.

DESCRIPTION OF RELATED ART

A shape detecting method has been known measuring an uneven shape of a subject to be detected on the basis of positional relationship between irradiating direction of projected light beam and the position image of the light pattern on detectors. The positioned relationship is measured by irradating a light beam which is spot-shaped or slit-shaped on the surface of the subject, and detecting the image of the light pattern formed on the surface of the subject by means of single dimensional or to dimensional detectors.

In U.S. Pat. No. 4,794,262 to Sato et al, for example, three has been disclosed an arrangement in which a projected light beam formed in a slit shape (which shall be hereinafter referred to as "sit light") by means of a laser beam source and cylindrical lens is projected on the surface of a subject while scanning the slit light in a direction intersecting at right angles the axial direction of the slit light by means of a polygon mirror as a deflection means. A light pattern formed on the surface of the subject is formed on a light receiving surface of an image take-up means comprising a matrix-shaped array of photosensors. With this arrangement, the time at which the slit light passes through a photosensor provided at a fixed position is regarded as a reference position for every scan of the slit light, and an irradiating direction (angle of deflection) of the slit light is recognized on the basis of an elapsing time from the time at which the slit light has passed through the reference position. Therefore, when an operation according to the triangulation is performed on the basis of the relationship of such irradiating direction of the projected light beam obtained as has been referred to in the above, the position of image formed at the image take-up means and so on, it is possible to measure the deviation from a predetermined reference plane with respect to a portion where the line of vision of every picture element of the image formed at the image take-up means intersects the surface of the subject.

With the above arrangement, however, the displacement from the predetermined reference plane is to correspond to the position of picture element of the image of the light pattern formed at the image take-up means, so that the resolution of the displacement from the reference plane is to be determined by means of the disposition of optical system and the pitch of arrangement of the picture elements in the image take-up means. Here, since the pitch of the picture elements in the image take-up means is constant, the field of view and the resolution are in conflicting relationship so that the resolution will be lowered when the field of view is widened and the field of view will be narrowered when the resolution is elevated. Further, the image take-up means of a small pitch of arrangement of the picture elements is generally expensive, and is restricted in respect of the resolution or the field of view so long as the arrangement is conventional, so that there have remained problems to be solved.

SUMMARY OF THE INVENTION

A primary object of the present invention is, therefore, to provide a method and device for detecting the shape of an object which is capable of solving the foregoing problems and of measuring at a high resolution the displacement of the surface of the object from a reference plane irrespective of the field of view.

A more specific object of the present invention is that, in determinig the displacement of the surface of the subject with respect to the reference plane by means of photosensors, the detection resolution of such displacement is determined by means of measuring pracise laspe of time, so that the resolution with respect to the displacement of the surface of the subject to detect can be remarkably improved in contrast to any known arrangement, when detectors having substantially the same level of the pitch of the picture element but without relying on the pitch of the detectors as has been conventionally employed. That is, a high resolution can be obtained in respect to the displacement of the subject without relying on the pitch of the picture elements of the detector, the field of view can be widened, and the detection precision of the displacement can be elevated through an accurate detection of the time when the image of a spot passes, by rendering the width of the light detecting part to be smaller than the image of a spot.

Another object of the present invention is to make it possible to provide a variable width of the image of a spot on the image plane of the light receiving lens with respect to the scanning width of the projected light spot even when the light receiving lens has an equimagnification, and eventually to obtain a wider field of view by employing a detector of a small length in the shifting direction of the image of a spot accompanying the scanning of the projected light spot.

Still another object of the present invention is to make it possible to dispose light detecting elements for detecting the image of a spot in detecting the position of the projected light spot at regular distance or angular intervals, so that the detector for detecting the position of the image of a spot can be simplified.

Yet another object of the present invention is to have the time when the image of a spot passes through the light detecting element detected at a high precision, so that the resolution with respect of the displacement of the subject can be further improved.

Still another object of the present invention is to make it possible to elevate the intensity of incidence image of a spot to the detector, so as to render the ratio with respect to such noise components as ambient light and to minimize any erroneous measurements.

Still another object of the present invention is to have the measuring precision with respect to the surface of the subject to detect determined by the detecting precision of the passing time of the projected light beam and the image of a spot, so as not to rely on the pitch of arrangement of the light detecting elements, so that a remarkable improvement in the measuring precision can be expected even at the present technical level as compared with conventional arrangements.

Still another object of the present invention is to improve the precision of detection of the laspe of time and eventually to improve the measuring precision of the displacement of the subject to detect.

Still another object of the present invention is to make it possible to set both the light projecting and receiving systems in the foregoing relationship, so as to make it possible to position the image of a spot on the narrow slit even when the surface of the subject has been displaced, and to be contributive to the improvement in the precision of the shape detection.

A further object of the present invention is to render easier the discrimination of the light to be detected from such noise components as the ambient light, by having the projected light from the light source incident on the detector without leakage but rather increasing the incident amount of light to the detector.

According to the present invention, the foregoing objects can be realized by means of a detection arrangement wherein a projected light spot, formed on the surface of the subject by irradiating a spot-shaped projected light beam on the surface of the subject, is scanned in a fixed direction. A position of the image of a spot which is an image of the projected light spot image-formed through a light receiving lens having an optical axis lying in a direction different from irradiating direction of the projected light beams, is detected by means of a first detector including a plurality of first light detecting elements arranged in an array. A width of the first light detecting elements in the direction of the arranged array of the light detecting elements is set to be less than the width of the image of a spot in the same direction. A time difference between a first time when the image of a spot with respect to the subject passes through any one of the first light detecting elements and a second time when the projected light beam passes through a position where the image of a spot is made to pass through one of second light detecting elements with respect to a reference plane set by the second light detecting elements is obtained, and this time difference is converted into a displacement of the surface of the subject with respect to the reference plane.

Other objects and advantages of the present invention shall become clear as the following description advances with reference to embodiments of the invention shown in accompanying drawings.

BRIEF DESCRIPTION OF THE DRAWINGS

FIG. 9 is a schematic diagram showing the entire arrangement of still another embodiment of the present invention;

Figure 1:
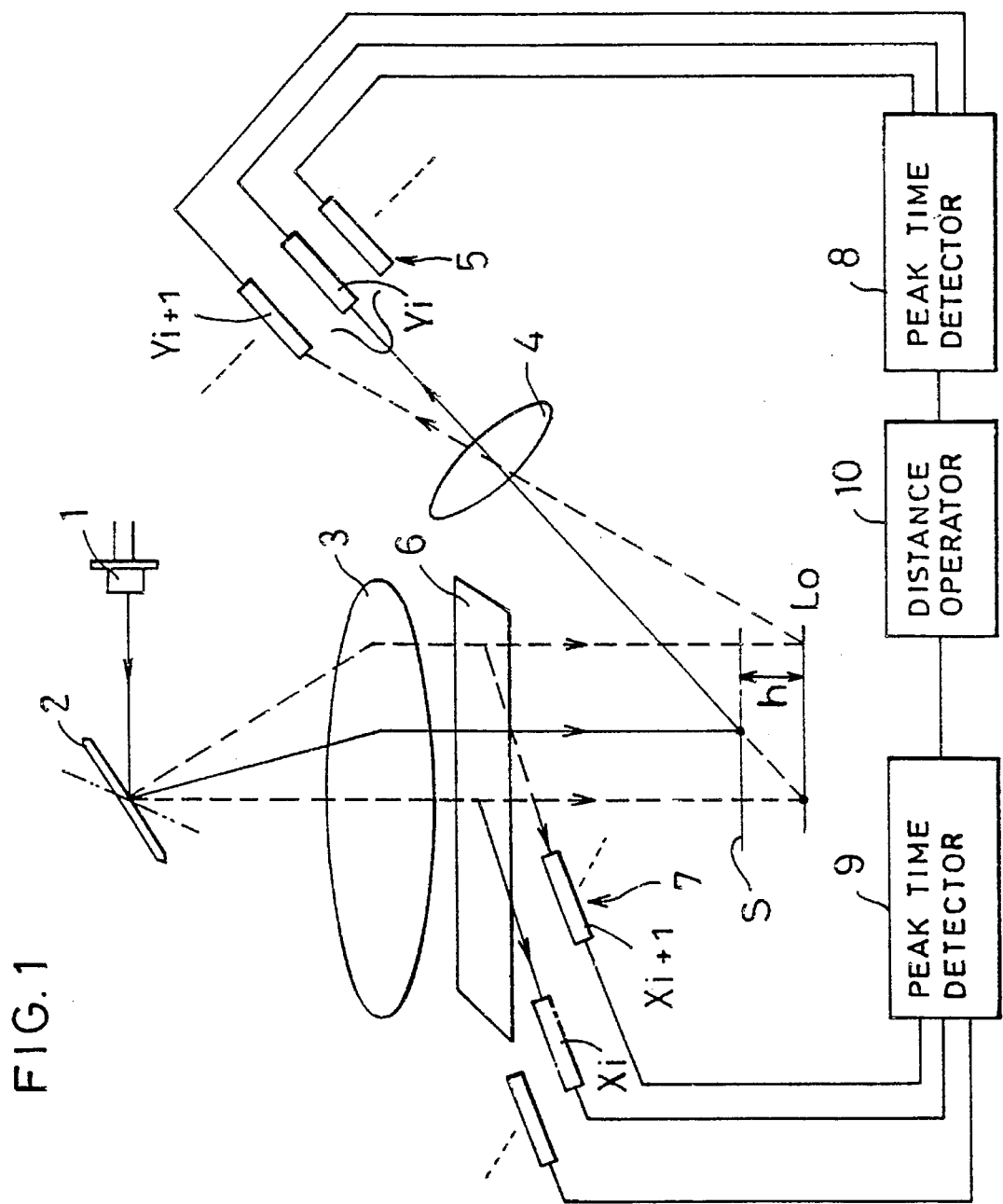
FIG. 1 shows in a schematic diagram the entire arrangement of the device performing the method for detecting the shape of an object in an embodiment according to the present invention.

While the present invention shall now be described with reference to the respective embodiments shown in the drawings, it should be appreciated that the intention is not to limit the invention only to these embodiments but rather to include all alterations, modifications and equivalent arrangements possible within the scope of appended claims.

DETAILED DESCRIPTION OF THE PREFERRED EMBODIMENTS

Embodiment 1

Referring to FIG. 1, there is shown an embodiment of the present invention. In this case, a light source 1 forming a spot-shaped projected light beam such a laser beam source is provided, and a light projecting system is constituted for deflecting the projected light from the source 1 by means of a vibration mirror 2 as a deflection means and thereafter irradiating through a light projecting lens 3 to a subject to be detected. At this time, the projected light beam is so set that the light intensity will be the largest in the central part and will be smaller to the peripheral part, that is, the intensity distribution will be a single hump shape (for example, the intensity distribution is set to be a Gaussian curve, triangular wave-shaped and so on). Such intensity distribution may be effectively realized by providing separately a filter for controlling a transmission factor distribution.

Figure 3:
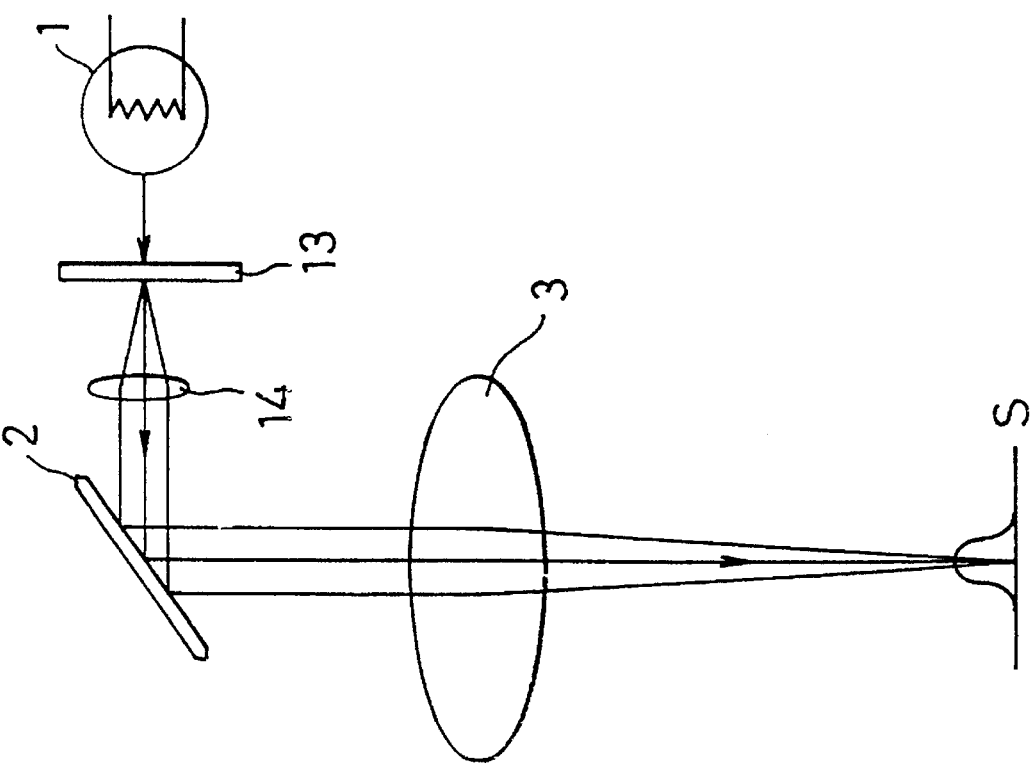
FIG. 3 is a fragmentary diagram for schematically showing another arrangement for controlling the intensity distribution of the projected light spot in the embodiment of FIG. 1.
Figure 2:
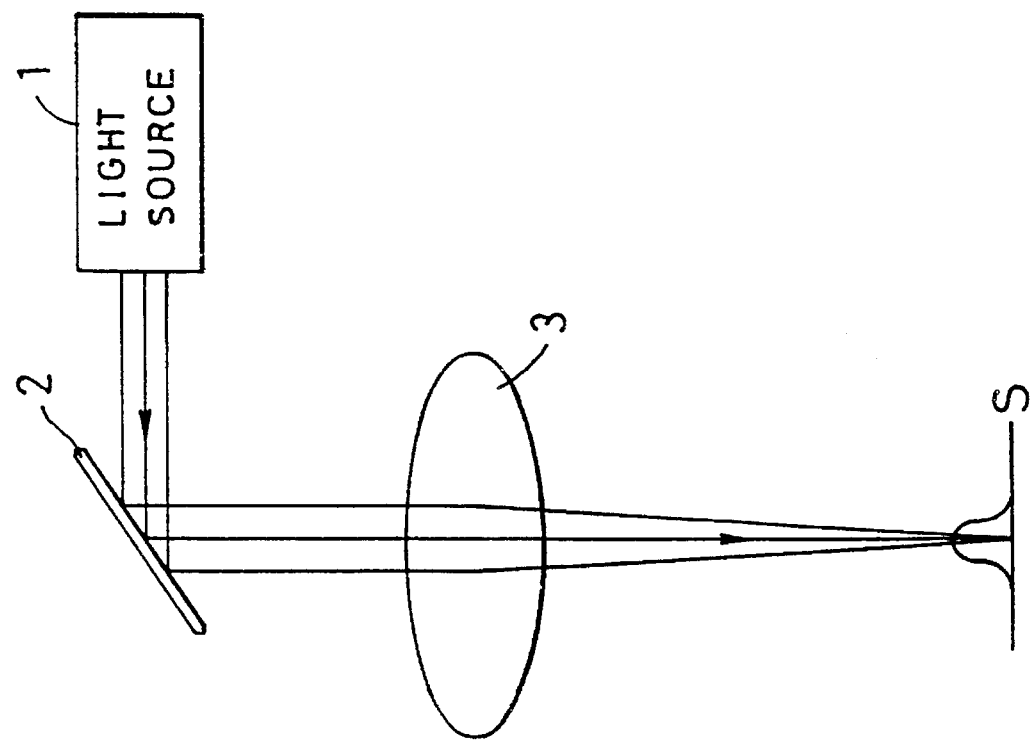
FIG. 2 is a fragmentary diagram for schematically showing an arrangement for controlling the light intensity distribution of the projected light spot in the embodiment of FIG. 1.

In the foregoing arrangement shown in FIG. 1 (see also FIG. 2), the laser beam source is employed as the light source 1, and the control is so made that the intensity distribution will form the gauss curve, by having the projected light beam converged on the surface of the subject to be detected by means of the light projecting lens 3. Even when any other light source than the laser beam source is employed, it is possible to obtain such intensity distribution as the Gaussian curve, by having the light pass through a pin hole formed in a light shielding plate 13 as shown in FIG. 3, forming the light into a parallel line of light rays through a collimating lens 14, thereafter deflecting the rays with a vibration mirror 2, and further converging the projected light beam on the surface of the subject through the light projecting lens 3.

The vibration mirror 2 performs reciprocating vibration so that the projected light beam from the light source 1 can be scanned within a single plane with a position where the optical axis of the light projecting lens 3 passes made as the center. The light projecting lens 3 is a convex lens, which is disposed so that its image focusing point coincides with irradiating position of the projected light beam from the light source 1 to the vibration mirror 2. That is, the vibration mirror 2 and light projecting lens 3 are constitute a telecentric optical system, so that the projected light beam scanned by the vibration mirror 2 radially expands with the irradiated position of the projected light beam from the light source 1 onto the vibration mirror 2 made as the center, but a projected light beam parallel to the optical axis of the light projecting lens 3 can be obtained as passed through the light projecting lens 3, irrespective of the position of the vibration mirror 2. Accordingly, so long as the surface of the subject is plane, the projected light beam is to be irradiated at a fixed angle, irrespective of the position on the surface of the subject. At this time, particularly in the present embodiment, the projected light beam is made to intersect at right angles the surface of the subject by rendering the optical axis of the light projecting lens 3 to intersect at right angles the surface of the subject to detect, and the project light beam is irradiated so as not to cause any shade to occur due to any unevenness even if the surface of the subject to detect is uneven.

Quantity of light of reflected light (diffuse reflection) on the surface of the subject varies depending on the angle, reflection factor or the like of the surface of the subject within the projected light spot formed by the irradiation of the projected light beam, and the reflected light is received by a single dimensional detector 5 through a light receiving lens 4 which is a converging lens. This light receiving lens 4 forms on a light receiving surface of the detector 5 an image of a spot image formed on the surface of the subject by the projected light beam, and a formed image spot is formed on the light receiving surface of the detector 5. Further, this detector 5 is constituted by a plurality of photosensors Y1, Y2, . . . respectively generating an output of a value in accordance with the received light intensity and respectively having each of light-receiving surfaces which are disposed on a single straight line. A direction in which the image of a spot shifts when the projected light beam is made to scan along the surface of the subject which is a plane at a fixed distance from the light projecting lens 3, is made in conformity to the line of disposition of the light-receiving surfaces of the photosensors Y1, Y2, . . . That is, the optical axis of the light receiving lens 4 is included and the light receiving surfaces of the photosensors Y1, Y2, . . . are disposed in the scanning plane of the projected light beam onto the surface of the subject. For the photosensors Y1, Y2, . . . , photodiodes, photomultipliers or the like may be employed, as disposed directly at positions where the image of a spot is formed, or a plurality of optical fibers optically coupled at their one end surfaces to the photodiodes or photomultipliers may be arranged to dispose the other end surfaces of them as the light receiving surfaces on a straight line at the position where the image of a spot are formed. Further, the width size of the light receiving surface of the respective photosensors Y1, Y2, . . . is so set as to be smaller than the diameter of the image of a spot. Disposition pitch of the light receiving surfaces of the photosensors Y1, Y2, . . . is set to be larger than the diameter of the image of a spot, and in accordance with a required resolution in the scanning direction of the projected light beam.

Here, with the width of the light receiving surface made smaller than the diameter of the image of a spot, the surface angle or reflection factor of the subject is made constant as viewed microscopically over a narrow range: the quantity of reflected light from the surface of the same part of the subject is rendered to be the quantity of light of the projected light beam in view of an influence of the angle of the surface of the subject or its reflection factor; and the intensity distribution of the image of a spot at the time when the spot passes the respective photosensors Y1, Y2, . . . is maintained to be the intensity distribution of the projected light beam as it is, whereby the time when a peak part of the intensity on the light receiving side is made to coincide with the time when a peak part of the intensity distribution of the projected light beam passes.

In order to measure a three dimensional shape of the surface of the subject, now, it is necessary to know an irradiating position of the projected light beam with respect to the surface of the subject. At this time, particularly in the present embodiment, the projected light beam is partly bifurcated by disposing a beam splitter 6 comprising a half-mirror between the light projecting lens 3 and the subject, and the projected light beam thus bifurcated is led to a detector 7, which is constituted by a plurality of photosensors X1, X2, . . . respectively generating an output responsive to a received light intensity and disposing their light receiving surfaces in a straight line. A disposing direction of the light receiving surfaces is made to coincide with the direction in which the projected light beam shifts upon scanning of the projected light beam. Provided that a reflection surface of the beam splitter 6 intersects at an angle of 45 degrees the plane including the projected light beam and the split light rays intersect at right angles the optical axis of the light projecting lens 3, the light receiving surfaces are to be disposed on a straight line parallel to the split light rays. The photosensors X1, X2, . . . comprise the photodiodes, photomultipliers or the like, and receive directly or through optical fibers the projected light beam split by the beam splitter 6. A pitch of disposition of the photosensors X1, X2, . . . is so set that, when a reference plane L0 intersecting at right angles the projected light beam is set as the subject and the projected light beam irradiated on the reference plane L0 is scanned, the received light intensity distribution of the respective photosensors Y1, Y2, . . . constituting the detector 5 and the received light intensity distribution of the respective photosensors X1, X2, . . . forming the detector 7 will coincide with each other. In other words, the photosensors X1, X2, . . . are provided in the same number as the photosensors Y1, Y2, . . . so that, when the projected light beam is made to scan the reference plane L0, the photosensors Xi and Yi showing the peak of the received light intensity correspond to each other one against one (in FIG. 1, the projected light spot formed on the reference plane L0 by a projected light beam of a broken line corresponding to the photosensor Xi is shown as a state of baing image-formed on the photosensor Yi).

Figure 4A:
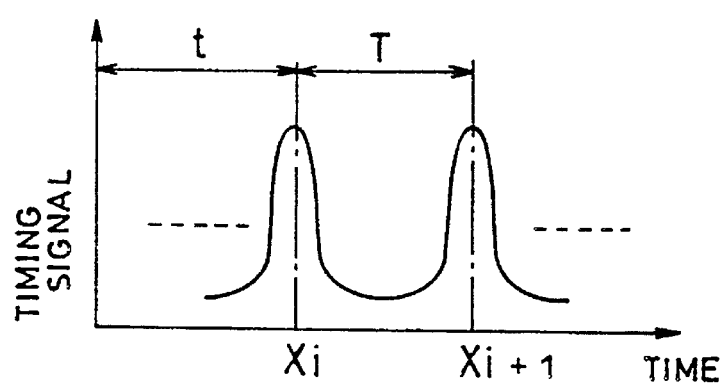
FIGS. 4(a) and 4(b) are explanatory diagrams for the operation of the embodiment of FIG. 1.
Figure 4B:
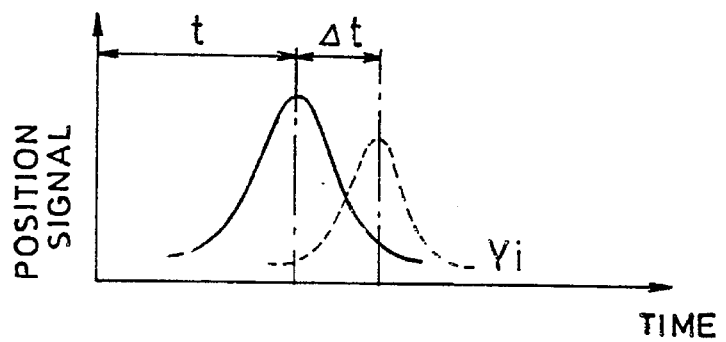

Provided here that signals corresponding to the received light intensity at the detector 5 are regarded as position signals while the signals corresponding to the received light intensity at the detector 7 are regarded as timing signals, the timing at which the magnitude of the position signals and timing signals reaches the peak in respect of the corresponding photosensors Yi and Xi of the detectors 5 and 7 will coincide with each other, as shown in FIG. 4, in the reference plane L0. That is, assuming that the time required for the position signal output from the photosensor Xi after initiation of the scanning of the projected light beam to reach the peak is made $t$, then the time required for the position signal output from the photosensor Yi after initiation of the scanning of the projected light beam to reach the peak will be also $t$. Further, reciprocating cycle of the vibration mirror 2 and disposition pitch of the photosensors X1, X2, . . . are so set that a time interval for which the position signals in respect of mutually adjacent photosensors Xi and Xi+1 in the detector 7 reach the peak will be $T$.

In the above described arrangement, it is assumed that the subject to detect has approached from the reference plane LO to the light projecting lens 3 by a distance $\underline{h}$, and the scanning direction of the projected light beam was rightward in FIG. 1. On the reference plane LO, the timing at which the position signal and timing signal reach the peak at the photosensor Xi of the detector 7 and at the photosensor Yi of the detector 5 will coincide with each other, whereas the displacement by the distance $\underline{h}$ causes, as shown in FIG. 4(*b*) by a broken line, the timing at which the position signal becomes the peak at the photosensor Yi to be delayed by a time difference Δt from the timing at which the timing signal becomes the peak in the photosensor Xi. That is, the delay of the time difference Δt is caused by the displacement of the subject by the distance $\underline{h}$ with respect to the reference plane LO, and the distance $\underline{h}$ can be obtained on the basis of this time difference Δt Here, so long as the time difference At is in a range smaller than the time interval T in which the position signal reaches the peak in respect of the adjacent photosensors Xi and Xi+1, it is made possible to obtain the distance $\underline{h}$ of the displacement from the reference plane LO in respect of the surface of the subject.

The timing at which signal values of the position signals and timing signals become the peak is detected by peak time detectors 8 and 9 corresponding to the detectors 5 and 7, and the distance $\underline{h}$ of the displacement from the reference plane LO is obtained at a distance operator 10 on the basis of the time difference Δt of the peak time. With such arrangement employed, it is enabled to elevate the resolution for detecting the distance $\underline{h}$ by elevating the detecting precision of the time difference Δt and, as compared with a conventional arrangement in which the resolution is determined only by the magnification of the light receiving optical system and the resolution of the light receiving element on the light receiving side, the mutually contrary demands in respect of the field of view and the resolution can be satisfied. Here, the precision of detecting the timing at which the position signal and timing signal reach the peak is determined by the relative relationship between the beam diameter of the projected light beam and the width of the light receiving surface of the photosensors Xi and Yi, and the detecting precision is elevated as the beam diameter is reduced and the width of the light receiving surface of the photosensors Xi and Yi is minimized. Further, since the intensity distribution of the projected light beam is set to be in the single hump shape as has been described, the position signal or timing signal output from the photosensor Xi or Yi reaches the peak at the time when the peak position of the intensity of the received light beam coincides with the center of the photosensor Xi or Yi, so long as the intensity distribution is so set that the maximum intensity will be at the center of the projected light beam. Accordingly, the resolution can be further elevated by rendering the intensity distribution of the projected light beam to be the single hump shape. In FIG. 1, the intensity distribution of the image of a spot is shown as an example in front of the photosensor Yi.

Now, in the foregoing arrangement, the optical axis of the light projecting lens 3 and the optical axis of the light receiving lens 4 are disposed on the same plane, so that the direction in which the image of a spot moves with respect to the displacement of the surface of the subject coincides with the direction in which the image of a spot moves upon the scanning of the projected light beam, and the width size in the direction intersecting at right angles the moving direction of the image of a spot in the detector 5 can be minimized. As a result, almost no secondary reflected light is made incident on the detectors even in the case where a plurality of the image of a spot is caused to be formed by the secondary reflection of the projected light beam, and amy possibility of erroneous detection can be reduced.

While in the foregoing arrangement the telecentric optical system is constituted by the vibration mirror 2 and light projecting lens 3, it is not always necessary to provide the telecentric optical system, since it may be sufficient to have the timing of receiving the projected light beam toward the subject at the respective photosensors X1, X2, . . . of the detector 7 coincided with the timing of receiving the light at the respective photosensors Y1, Y2, . . . of the detector 5, as will be clear from the foregoing descriptions.

Embodiment 2

Figure 5:
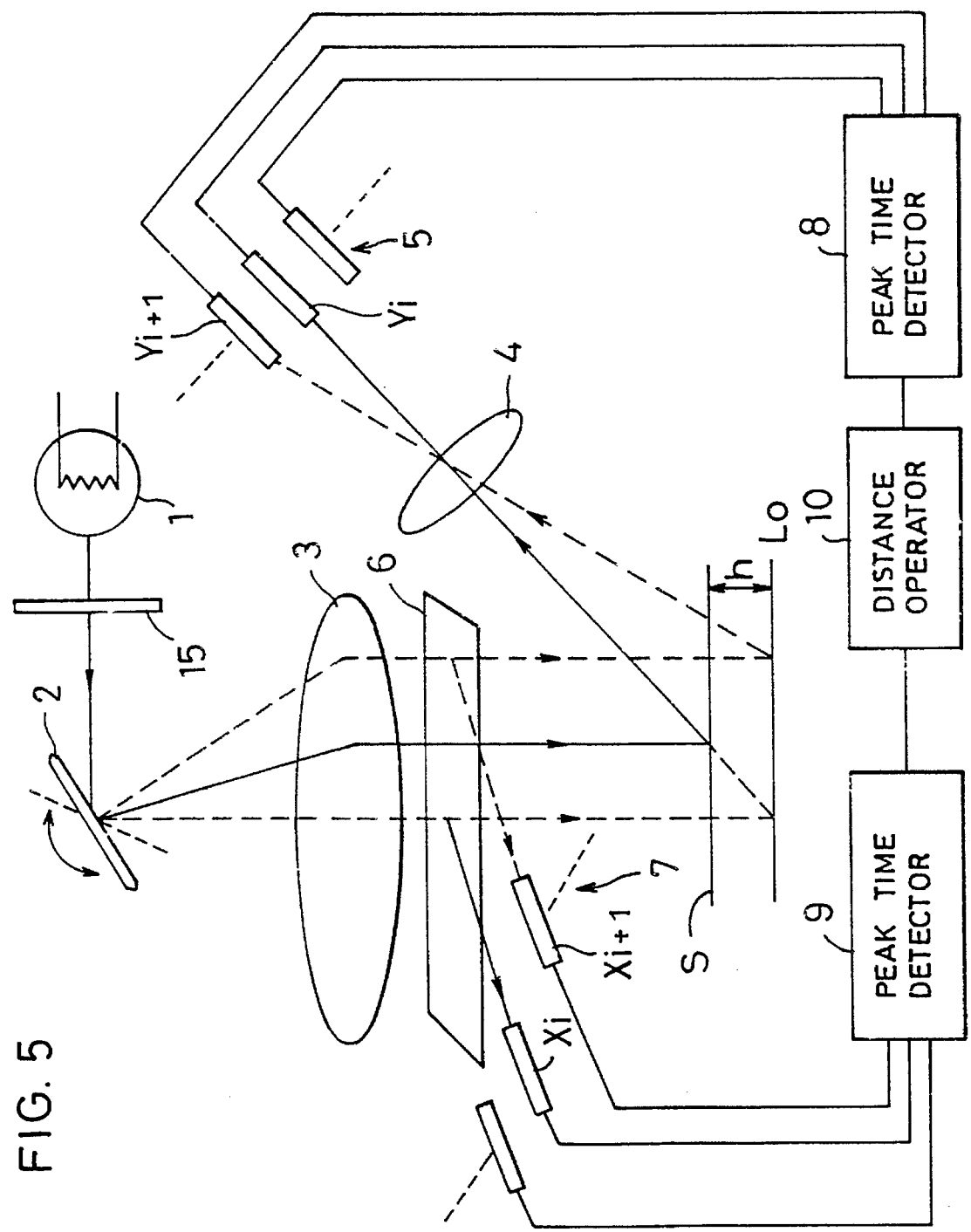
FIG. 5 is a schematic diagram showing the entire arrangement of another embodiment of the present invention.
Figure 6:
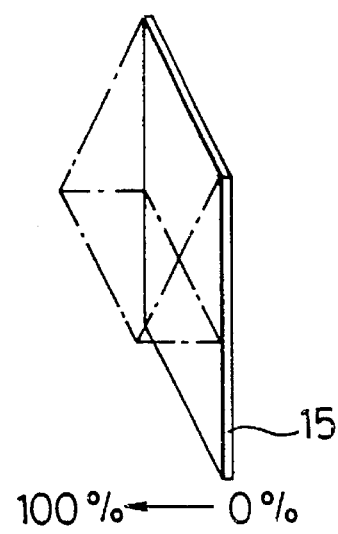
FIG. 6 is a diagram showing the transmission factor distribution of a filter employed in the embodiment of FIG. 5.

While in Embodiment 1 the intensity distribution of the projected light spot has been made as being the Gaussian curve shape, an example of the distribution set in a sawtooth wave form is shown in the present embodiment. As shown in FIG. 5, a light source 1 other than a laser beam source is employed, the light from which is made incident on the vibration mirror 2 after attaining the intensity distribution in the saw-tooth wave form as passed through a filter 15, and is made to converge by the light projecting lens 3 upon the surface of the subject to detect. For the filter 15, one having a distribution of transmission factor set as shown in FIG. 6 is employed, which is formed to shield any light at a portion below the center line, to have 100% of the transmission factor at a portion adjacent to the center line, and the reduce the transmission factor at a constant rate toward upper edge in remaining portion above the center line (single dot chain line in FIG. 6 shows the transmission factor).

Figure 7A:
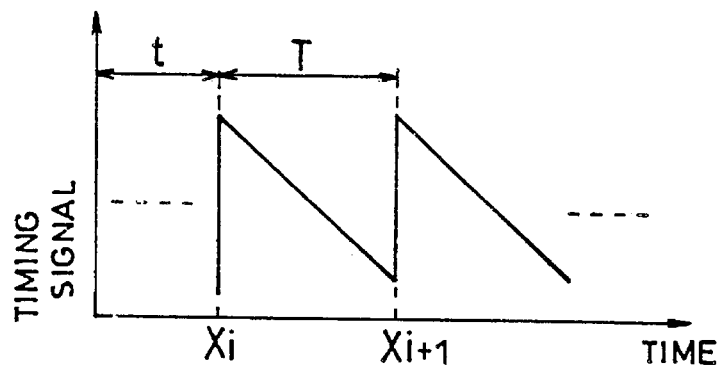
FIGS. 7(a) and 7(b) are explanatory diagrams for the operation of the embodiment of FIG. 5.
Figure 7B:
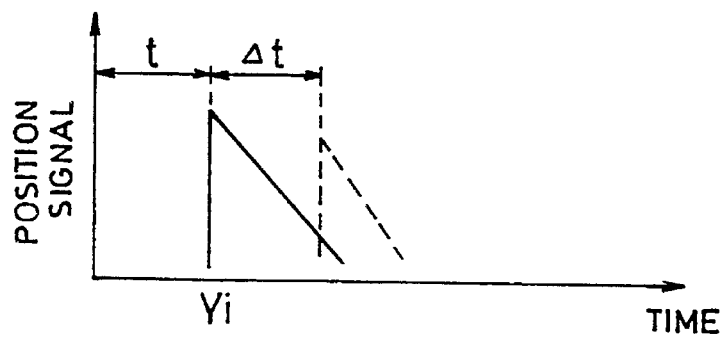

In the present embodiment, the same operation as in Embodiment 1 is attained except for the difference in the intensity distribution of the projected light spot. That is, as shown in FIG. 7(*a*), the timing signals output from the photosensors Xi, Xi+1 m, . . . of the detector 7 accompanying the scanning of the projected light beam reach the peak at the time intervals T. On the other hand, the position signal output from the photosensor Yi of the detector 5 attains the peak as shown in FIG. 7(*b*), as deviated by the time difference Δt (upon which the position signal varies as shown by broken lines) with respect to the time when the peak is reached with respect to the reference plane LO due to the displacement, $\underline{h}$ with respect to the reference plane LO (the position signal output from the photosensor Yi with respect to the reference plane LO varies as shown by solid lines). Therefore, the displacement $\underline{h}$ can be obtained by converting the time difference Δt into the displacement $\underline{h}$ by means of the distance operator 10. Other arrangement and operation are the same as those in the foregoing Embodiment 1.

Figure 8:
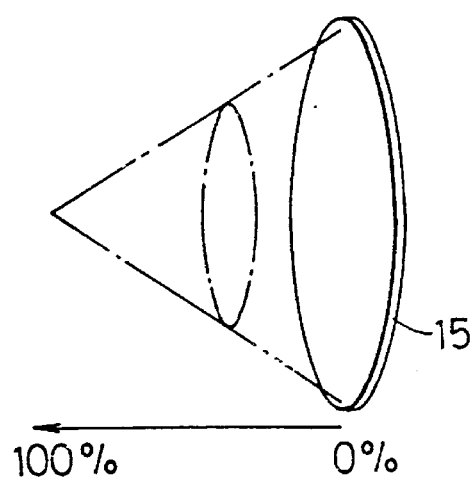
FIG. 8 is a diagram showing the transmission factor distribution of another filter employed in the embodiment of FIG. 5.

While in the present case of Embodiment 2 the projected light spot is set to be of the intensity distribution of the saw-tooth wave shape, the filter 15 of which the transmission factor is set to have such distribution as shown in FIG. 8 may be employed in an event where the distribution is set to be triangular wave shape. This filter 15 is formed in a circular shape, in which the transmission factor is 100% in the center part and is reduced at a constant rate toward peripheral part (single dot chain line in FIG. 8 shows the transmission factor).

Embodiment 3

While in Embodiment 1 the light receiving lens 4 is disposed to have its optical axis included in the plane including the optical axis of the light projecting lens 3 and the scanning line formed on the surface of the subject, there may be taken an arrangement in the present embodiment where, as shown in FIG. 9, the light receiving lens 4 is disposed so that the plane including the optical axes of both the light projecting lens 3 and light receiving lens 4 intersects at right angles the plane including the optical axis of the light projecting lens 3 and the scanning line. Further, the photosensors Y1, Y2, . . . of the detector 5 respectively have a light receiving surface of an elongated rectangular shape, and such light receiving surfaces are arranged in a plane intersecting at right angles the optical axis of the light receiving lens 4 and in a direction slanted by a predetermined angle with respect to the direction in which the image of a spot moves due to the scanning of the projected light beam, that is, the direction parallel to the scanning line.

Provided here that the light receiving surfaces of the photosensors Y1, Y2, . . . constituting the detector 5 are arranged in parallel to the scanning line in general and the subject has a portion closer by the distance $\underline{h}$ to the light-projecting lens 3 than the reference plane LO on the scanning line, then the position of the image of a spot is to displace in the direction intersecting at right angles the arranging direction of the light receiving surfaces of the photosensors Y1, Y2, . . . Since in the present embodiment the arranging direction of the photosensors Y1, Y2, . . . is slanted by the predetermined angle with respect to the direction parallel to the scanning line, on the other hand, the timing of forming the image of a spot on the photosensors Y1, Y2, . . . in respect of the displacement by the distance $\underline{h}$ is caused, similarly to the embodiment 1, to be different from the timing in the case when the projected light beam is irradiated onto the reference plane LO. That is, when the projected light beam is irradiated on a point PO on the reference plane LO in FIG. 9, the position of the image of a spot on the detector 5 will be at a point P1, but, due to the displacement of the distance $\underline{h}$, the projected light beam is irradiated onto a point Ro and the image of a spot is to be formed at a point R1. Accordingly, the photosensor Yi which renders the position signal to be at the peak upon formation of the image of a spot at the point P1 is to render the position signal to be at the peak upon formation of the image of a spot at a point Q1 as the projected light beam is irradiated upon a point Qo in the event where the displacement of the distance $\underline{h}$ is present. In short, the respective photosensors X1, X2, . . . of the detector 7 and the respective photosensors Y1, Y2, . . . of the detector 5 attain the peak of the received light intensity at the same timing with respect to the scanning of the projected light beam on the reference plane LO, whereas there arises a timing lag by the time difference Δt with respect to the displacement of the distance $\underline{h}$, and it is made possible to obtain the distance $\underline{h}$ on the basis of this time difference Δt.

Since in the present embodiment the position of the image of a spot displaces with respect to the arranging direction of the photosensors Y1, Y2, . . . , the light receiving surfaces of the photosensors Y1, Y2, . . . are required to be set in the width size to be wide enough for being capable of receiving the light even when the position of the image of a spot is caused to deviate due to the displacement of the distance $\underline{h}$, but the arranging pitch of the light receiving surfaces may be at regular intervals, and the detector 5 can be easily realized. Other arrangement and operation are the same as those in the foregoing Embodiment 1.

Embodiment 4

Figure 10:
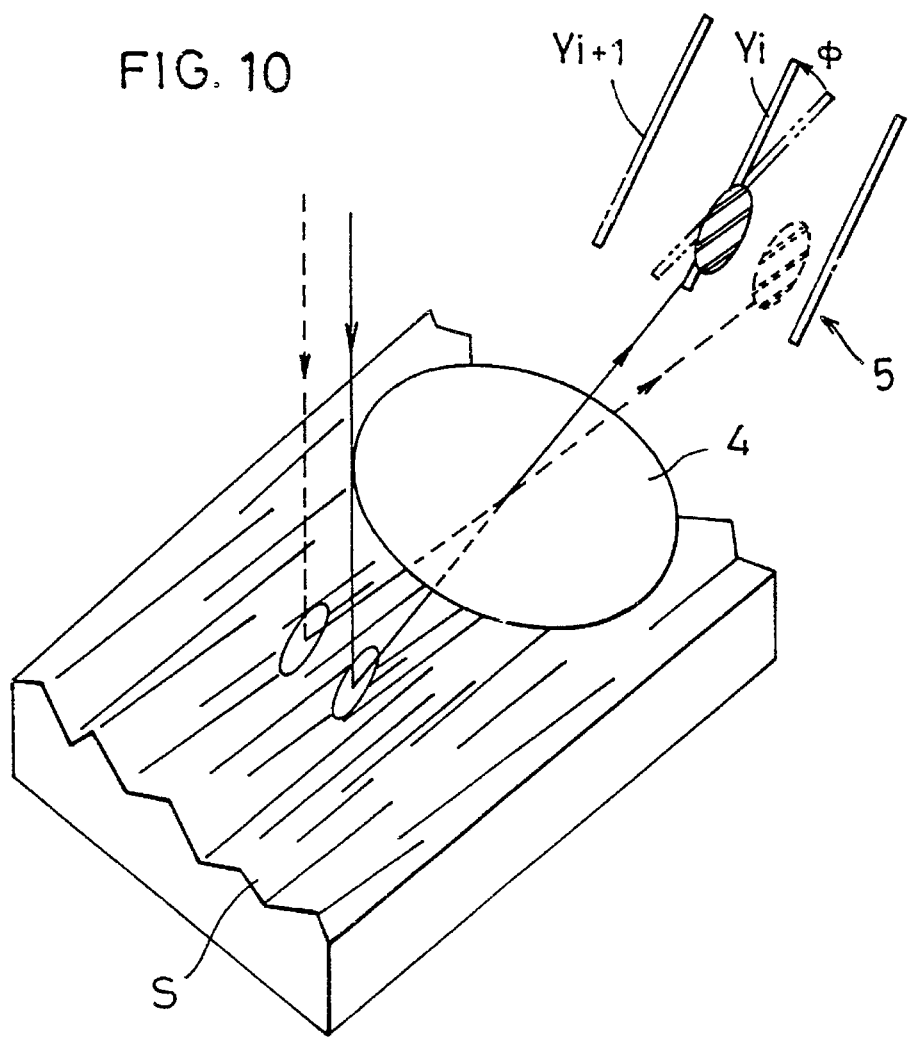
FIG. 10 is an explanatory view for the operation in still another embodiment of the present invention.
Figure 11:
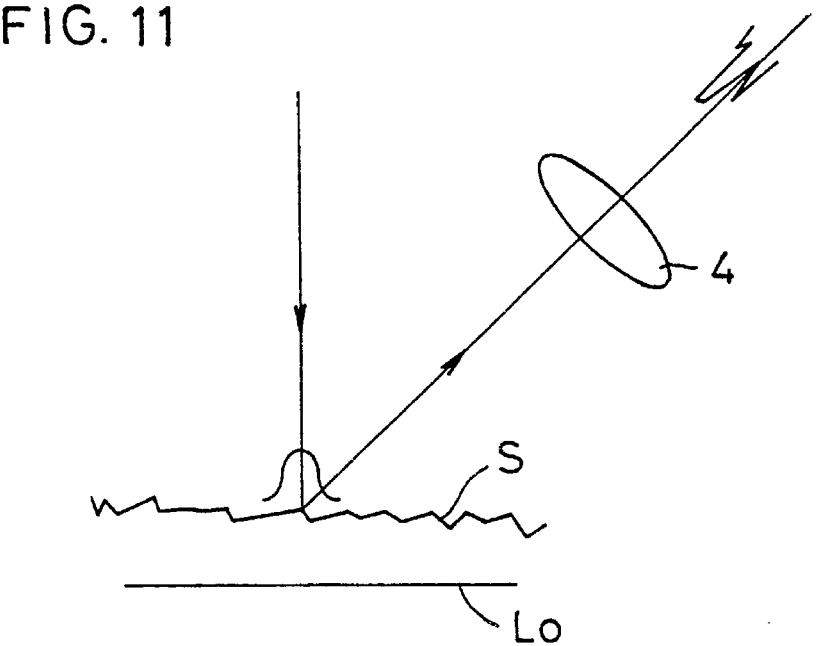
FIG. 11 is an explanatory view for a comparative example for the embodiment of FIG. 10.

The present embodiment is an example of arrangement for an event where many streaks exist in the surface of the subject (which often occur when polished, ground or rolled surface of metal, for example, is fabricated), which arrangement is similar to that of Embodiment 1 but, as shown in FIG. 10, the photosensors Y1, Y2, . . . in the detector 5 are formed in an elongated shape, and a longitudinal direction of the respective photosensors Y1, Y2, . . . is slanted by a predetermined angle φ with respect to the image of the streaks formed on the image plane of the light receiving lens 4.

Now, it should be assumed that the subject to detect has a surface in which the streaks are formed substantially in one direction in the microscopic view, as in the case of foregoing metal surface. With such subject and provided that the plane including the optical axes of the light projecting lens 3 and light receiving lens 4 is made to substantially intersect at right angles the streaks, then there are satisfied conditions for a regular reflection at part of very fine slopes formed in the streaks between a line of view from the respective photosensors Y1, Y2, . . . through the center of the light receiving lens 4 and the projected light beam. Thus, as has been disclosed, the photosensors Y1, Y2, . . . are disposed as slanted and the image of many of the streaks is made to be incident on the photosensors Y1, Y2, . . . on the image plane of the light receiving lens 4, so that the image of a spot received at the photosensors Y1, Y2, . . . is caused to include also the regular reflection component and, eventually, the quantity of received light is increased. As the quantity of light incident upon the photosensors Y1, Y2, . . . is thus increased, the discrimination between such noise component as ambient light and the image of a spot is made easier, and the detecting precision is eventually improved.

Figure 12:
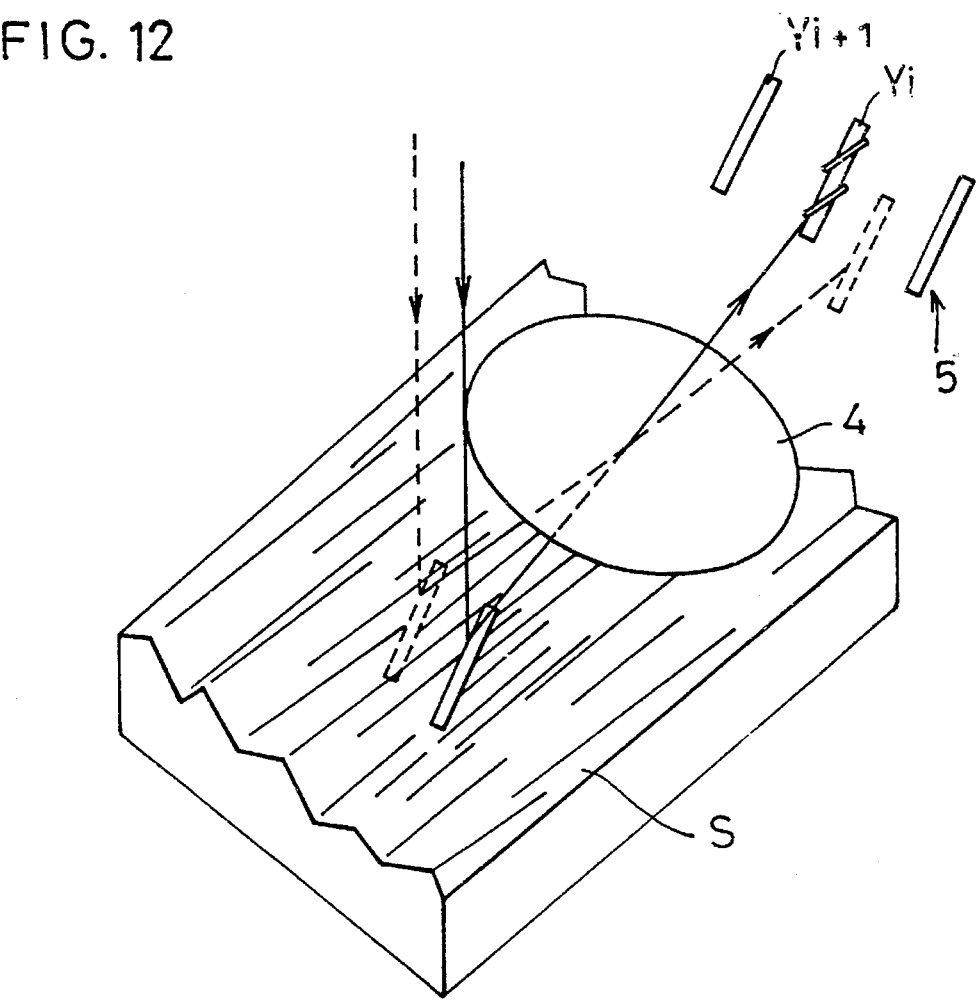
FIG. 12 is an explanatory view for another sectional shape of the projected light beam in the embodiment of FIG. 10.

Further, since in the present embodiment the light receiving surfaces of the photosensors Y1, Y2, . . . of the detector 5 are formed in the elongated rectangular shape and are disposed as slanted by the predetermined angle φ with respect to the direction of the streaks, it is made easier to obtain a image of a spot lying over a plurality of the streaks by rendering also the horizontal section of the projected light beam to be an ellipse elongated in the direction of the photosensors Y1, Y2, . . ., and any variation in the quantity of light due to the image of the streaks can be cancelled by rendering the image of the plurality of streaks to be received simultaneously at one of the photosensors Y1, Y2, . . . Here, the streaks of the kind referred to have a width of an extend of about one fifth of the width of the respective photosensors Y1, Y2, . . . and the photosensors are provided for not detecting any displacement due to the streaks. For the shape of the light receiving surface of the photosensors Y1, Y2, . . . and the horizontal section of the projected light beam, any other shape may be employed. As shown, for example, in FIG. 12, the horizontal section of the projected light beam is made to be the elongated rectangular shape in the event where the shape of the light receiving surface of the photosensors Y1, Y2, . . . so as to render the shape of the image of a spot and the shape of the light receiving surface of the photosensors Y1, Y2, . . . to be in conformity to each other, and it is made possible to satisfy concurrently two objects of enlarging the quantity of received light at the photosensors Y1, Y2, . . . and elevating the precision of detection the displacement, in contrast to the case where the shapes are not in conformity. Other arrangement and operation are in the same as those the foregoing Embodiment 1.

Embodiment 5

Figure 13:
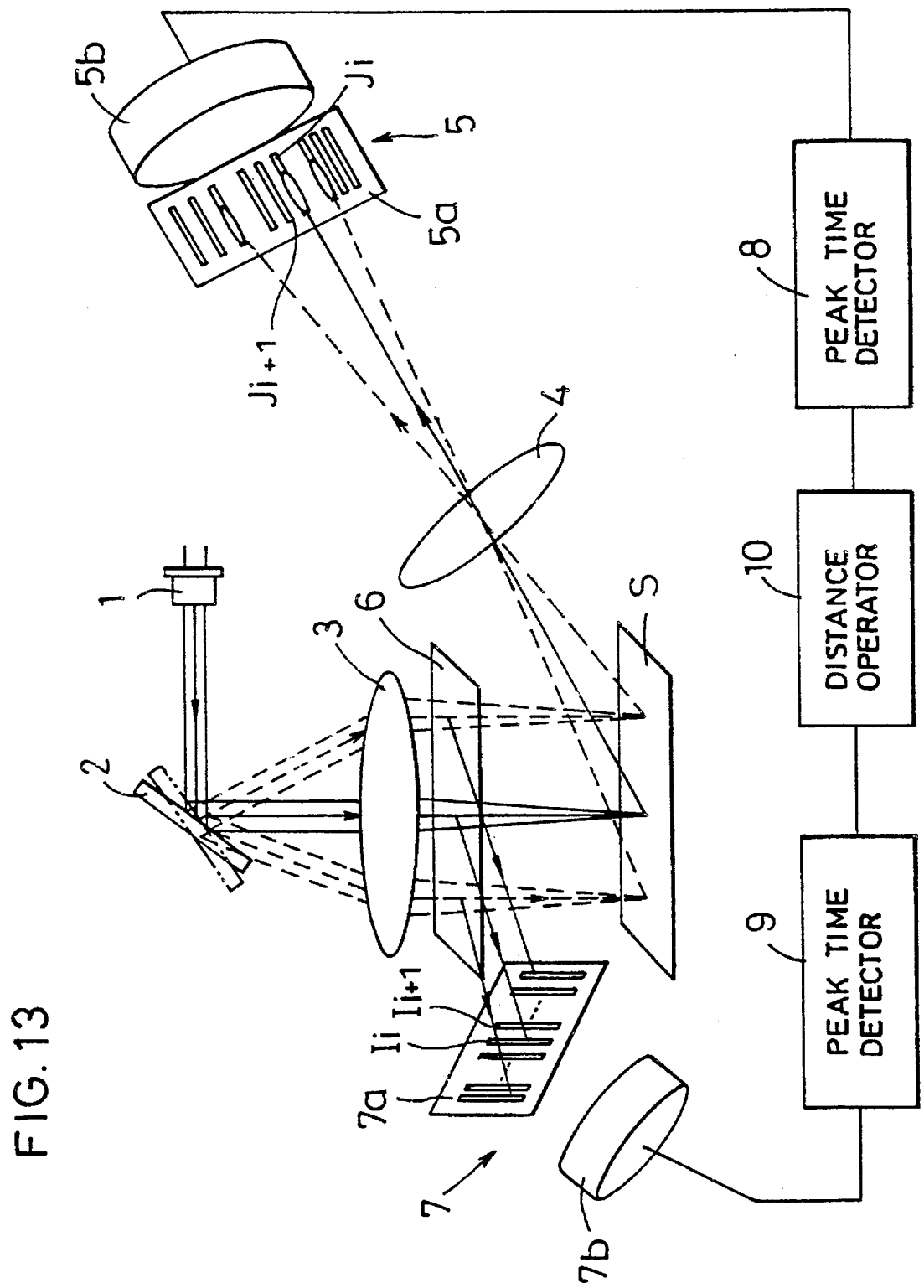
FIGS. 13 to 18 are schematic diagrams showing the entire arrangement in respective other embodiments of the present invention.

While in the foregoing embodiments the detectors 5 and 7 are respectively constituted by independent groups of a plurality of the photosensors X1, X2, . . . and Y1, Y2, . . . the detectors 5 and 7 in the present embodiment as shown in FIG. 13 comprise respectively a slit plate 5a or 7a having many slits I1, I2, . . . or J1, J2, . . . and a single photosensor 5b or 7b for receiving the light passed through the slit plate 5a or 7a. When this arrangement is adopted for the detectors 5 and 7, required components are reduced for simplification of structure in contrast to the foregoing embodiments in which the detectors 5 and 7 are employing many photosensors X1, X2, . . . and Y1, Y2, . . ., and required electric connection is also made easier. In this case, the slits I1, I2, . . . and J1, J2, . . . in the respective slit plates 5a and 7a are respectively formed in an elongated shape and arranged mutually in parallel. Further, the plane including the optical axes of the light projecting lens 3 and light receiving lens 4 is so set in the positional relationship so as to include the scanning direction of the projected light beam. This positional relationship corresponds to the arrangement of Embodiment 1.

In the arrangement of the present embodiment, there arises a variation in the quantity of received light at the photosensors 5b and 7a between the time when the light passes through central part of the respective slits I1, I2, . . . and J1, J2, . . . in the slit plates 5a and 7a and the time when the light passes through end portions of the slits I1, I2, . . . and J1, J2, . . ., so that it is made possible to obtain the same outputs as in Embodiment 2 as the position and timing signals. Other arrangement and operation are the same as those in the foregoing Embodiment 1.

Embodiment 6

Figure 14:
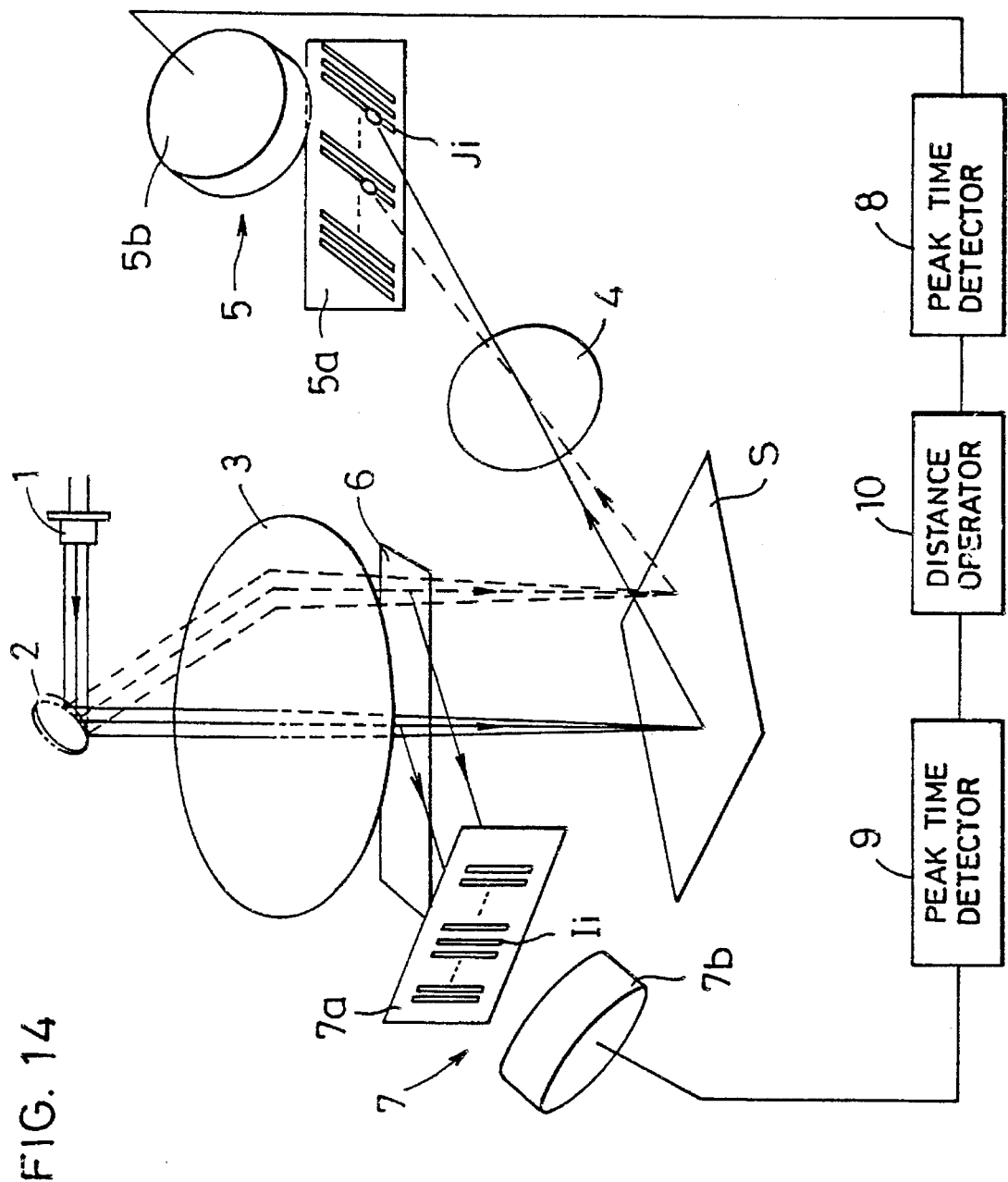

In the present embodiment, as shown in FIG. 14, the detectors 5 and 7 respectively comprise, similarly to Embodiment 5, the slit plate 5a or 7a and the single photosensor 5b or 7b, while the plane including both optical axes of the light projecting lens 3 and light receiving lens 4 is so set in the positional relationship as to intersect at right angles the scanning direction of the projected light beam. This positional relationship is corresponding to the arrangement in the foregoing Embodiment 2, and the slits J1, J2, . . . in the detector 5 are provided as slanted by a predetermined angle with respect to the moving direction of the image of a spot.

Since the outputs of the photosensors 5b and 7b can be treated in the same manner as the position signal or timing signal in the foregoing Embodiment 2, the displacement of the subject can be obtained through the same operation as in Embodiment 2. Other arrangement and operation are the same as those in the foregoing Embodiment 2.

Embodiment 7

Figure 15:
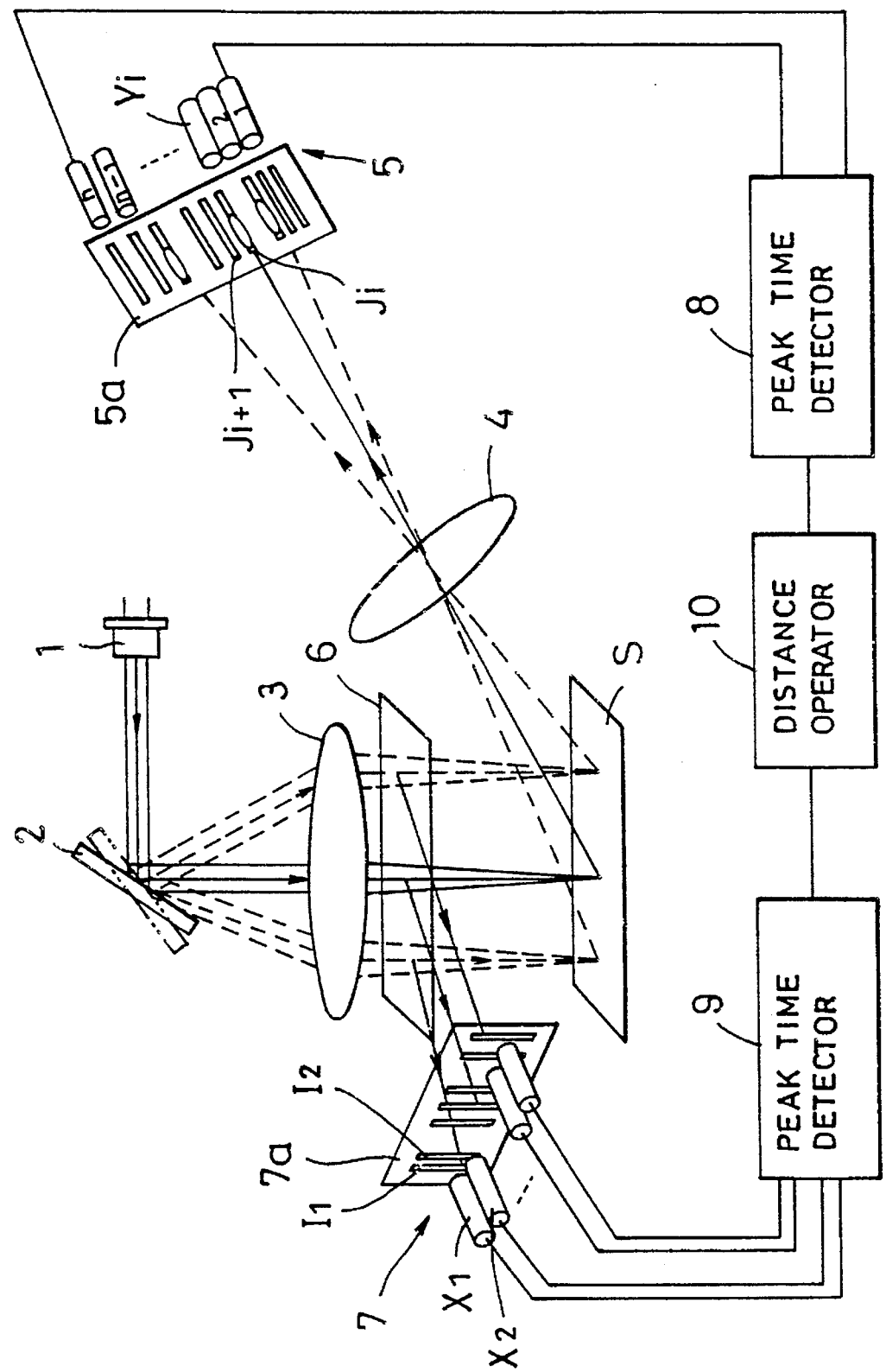
Figure 16:
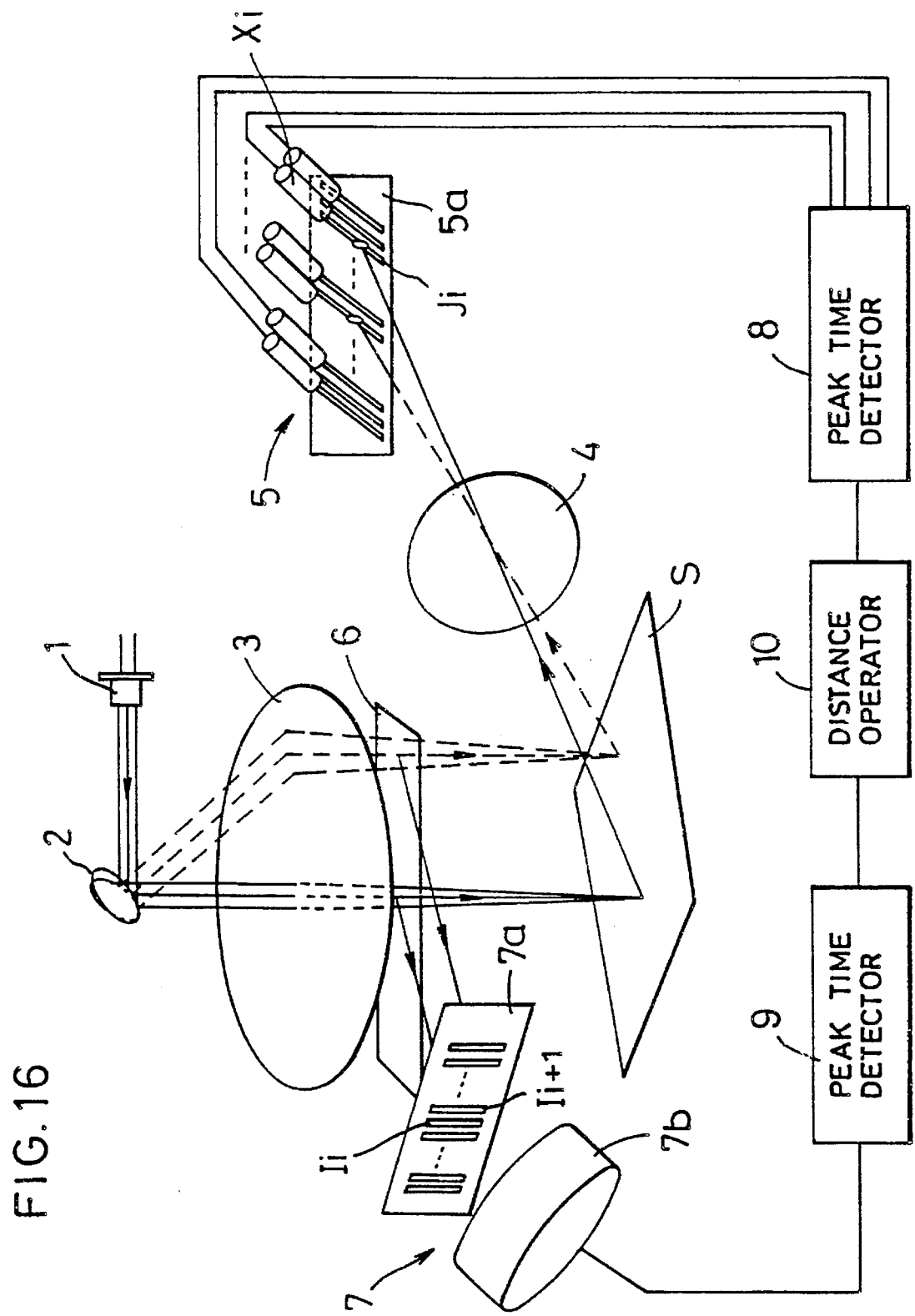

In the present embodiment, as shown in FIG. 15, the detectors 5 and 7 respectively comprise the slit plate 5a or 7a and a group of individual photosensors X1, X2, . . . or Y1, Y2, . . . corresponding to the respective slits I1, I2, . . . or J1, J2, . . . in the slit plate 5a or 7a. The plane including the optical axes of the light projecting lens 3 and light receiving lens 4 is so set in the positional relationship as to include the scanning direction of the projected light beam, and their arrangement is made the same as that in the foregoing Embodiment 1. That is, in contrast to the arrangement of the foregoing Embodiment 1, the slit plates 5a and 7a are disposed in front of the photosensors X1, X2, . . . and Y1, Y2, . . . Further, the outputs of the respective photosensors X1, X2, . . . and Y1, Y2, . . . are provided with a discriminator for individual discrimination.

With the slit plates 5a and 7a disposed in front of the photosensors X1, X2, . . . and Y1, Y2, . . . as referred to in the above, the light receiving surface area of the resepctive photosensors X1, X2, . . . and Y1, Y2, . . . can be restricted and, as a result, it is made possible to elevate the detecting precision of the displacement by rendering the detection time of the peak in the position signal and timing signal to be abrupt. That is, an opening width of the slits I1, I2, . . . and J1, J2, . . . in their direction of arrangement is set to be smaller than the width of the light receiving surface of the corresponding photosensors X1, X2, . . . and Y1, Y2, . . ., whereby the light is allowed to be incident on the light receiving surface only at its portion adjacent to the maximum intensity of the projected light beam or the image of a spot, and the detecting precision of the peak intensity position is elevated. Here, it is desirable that the center position of the slits I1, I2, . . . and J1, J2, . . . and the center position of the light receiving surfaces of the corresponding photosensors X1, X2, . . . and Y1, Y2, . . . are made conformity to each other.

Further, in an event where the respective photosensors X1, X2, . . . and Y1, Y2, . . . are not discriminated in the detectors 5 and 7 as in the resepctive foregoing embodiments, the displacement of the subject from the reference plane L0 within a range corresponding to the pitch of the photosensors X1, X2, . . . and Y1, Y2, . . . as well as the slits I1, I2, . . . and J1, J2, . . . can be measured, but there arises a risk that the displacement exceeding the range corresponding to the pitch cannot be measured any more. Accordingly, in the present embodiment, the discriminator is set for the respective photosensors X1, X2, . . . and Y1, Y2, . . . so that the outputs of these photosensors can be discriminated individually and it is made possible to discriminate the displacement even exceeding the range corresponding to the pitch. That is, it is made possible to measure the time difference Δt in the detection of the peak at the corresponding photosensors Xi and Yi in the detectors 5 and 7, and a measuring range of the displacement is made broader in contrast to the arrangement in which the time difference Δt of the peak of the position signals and timing signals as the whole of the detectors 5 and 7. Further, as compared with the arrangement of Embodiment 5, the light that has passed through the slits I1, I2, . . . and J1, J2, . . . is received by the individual photosensors X1, X2, . . . and Y1, Y2, . . . so that there arises no variation in the received light intensity by the photosensors X1, X2, . . . and Y1, Y2, . . . depending on the position of the slits I1, I2, . . . and J1, J2, . . . in respect of the light of the same intensity, and the detecting precision of the displacement can be eventually elevated. Other arrangement and operation are the same as those in the foregoing Embodiment 1.

Embodiment 8

In the present embodiment., such detectors 5 and 7 as shown in Embodiment 7 are replaced by the detectors 5 and 7 in Embodiment 2. That is, employed here is the arrangement in which the slit plates 5a and 7a having the slits I1, I2, . . . and J1, J2, . . . corresponding to the light receiving surfaces of the respective photosensors X1, X2, . . . and Y1, Y2, . . . in Embodiment 2 are disposed in front of the photosensors X1, X2, . . . and Y1, Y2, . . . The slits J1, J2, . . . in the slit plate 5a corresponding to the detector 5 are slanted by the predetermined angle with respect to the moving direction of the image of a spot. While the slits J1, J2, . . . here are formed in the elongated shape, the light receiving surfaces of the photosensors X1, X2, . . . and Y1, Y2, . . . are circular shaped. Similarly to Embodiment 7, further, the respective photosensors X1, X2, . . . and Y1, Y2, . . . are provided with the discriminator, so that the measuring range of the displacement is made to be a broad range. Other arrangement and operation are the same as those in the foregoing Embodiment 2.

Embodiment 9

Since in the arrangement of Embodiment 7 the photosensors X1, X2, . . . and Y1, Y2, . . . of the same number as that of the slits I1, I2, . . . and J1, J2, . . . provided in the slit plates 5a and 7a are provided in the detectors 5 and 7 and the outputs of the respective photosensors X1, X2, . . . and Y1, Y2, . . . are individually discriminated, the outputs of the respective photosensors X1, X2, . . . and Y1, Y2, . . . are to be individually connected to the peak time detectors 8 and 9, and there arises a risk that the number of wire connection has to be remarkably increased.

Figure 17:
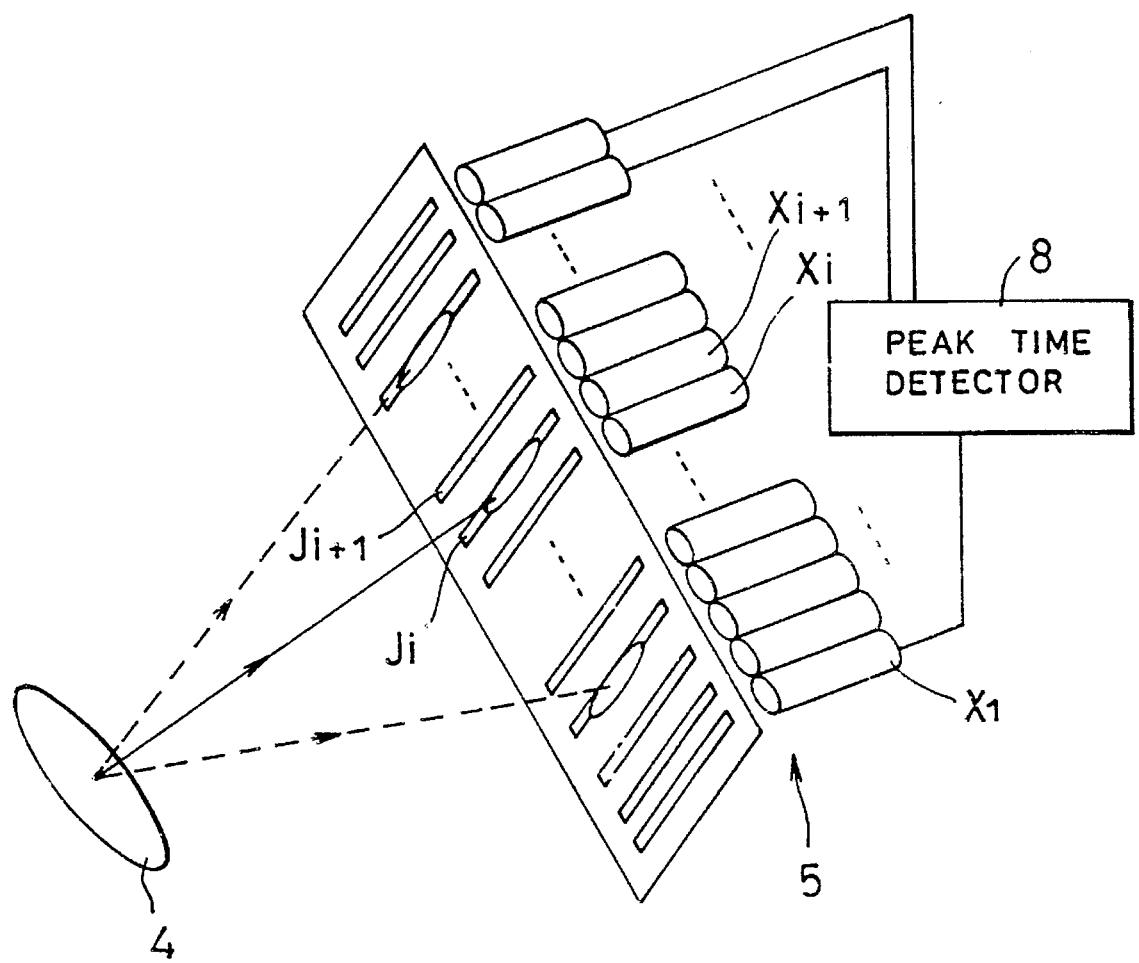

In the present embodiment, here, as shown FIG. 17, the number of wire connection is reduced by providing the same discriminator to every fixed number in the arranging direction of the photosensors X1, X2, . . . and Y1, Y2, . . ., and the outputs of the photosensors X1, X2, . . . and Y1, Y2, . . . provided with the same discriminator are connected collectively to the peak time detectors 8 and 9. For example, eight discriminators from 0 to 7 are provided circulatingly, and the photosensors X1, X2, . . . and Y1, Y2, . . . of the same discriminator are connected in parallel. According to this arrangement, the displacement up to the one corresponding to a size eight times as large as the arranging pitch of the photosensors X1, X2, . . . and Y1, Y2, . . . is enabled to be discriminated, and, though the measuring range of the displacement is narrowered as compared with Embodiment 7, the measuring range is made eight times as large as that of Embodiment 1. While at this time the type of the discriminator is made to be eight, the number of the discriminators may properly be altered in accordance with the measuring range of the displacement. Other arrangement and operation are the same as those in the foregoing Embodiment 7. The detectors 5 and 7 employed in the present embodiment may be applied to Embodiment 8.

Embodiment 10

Figure 18:
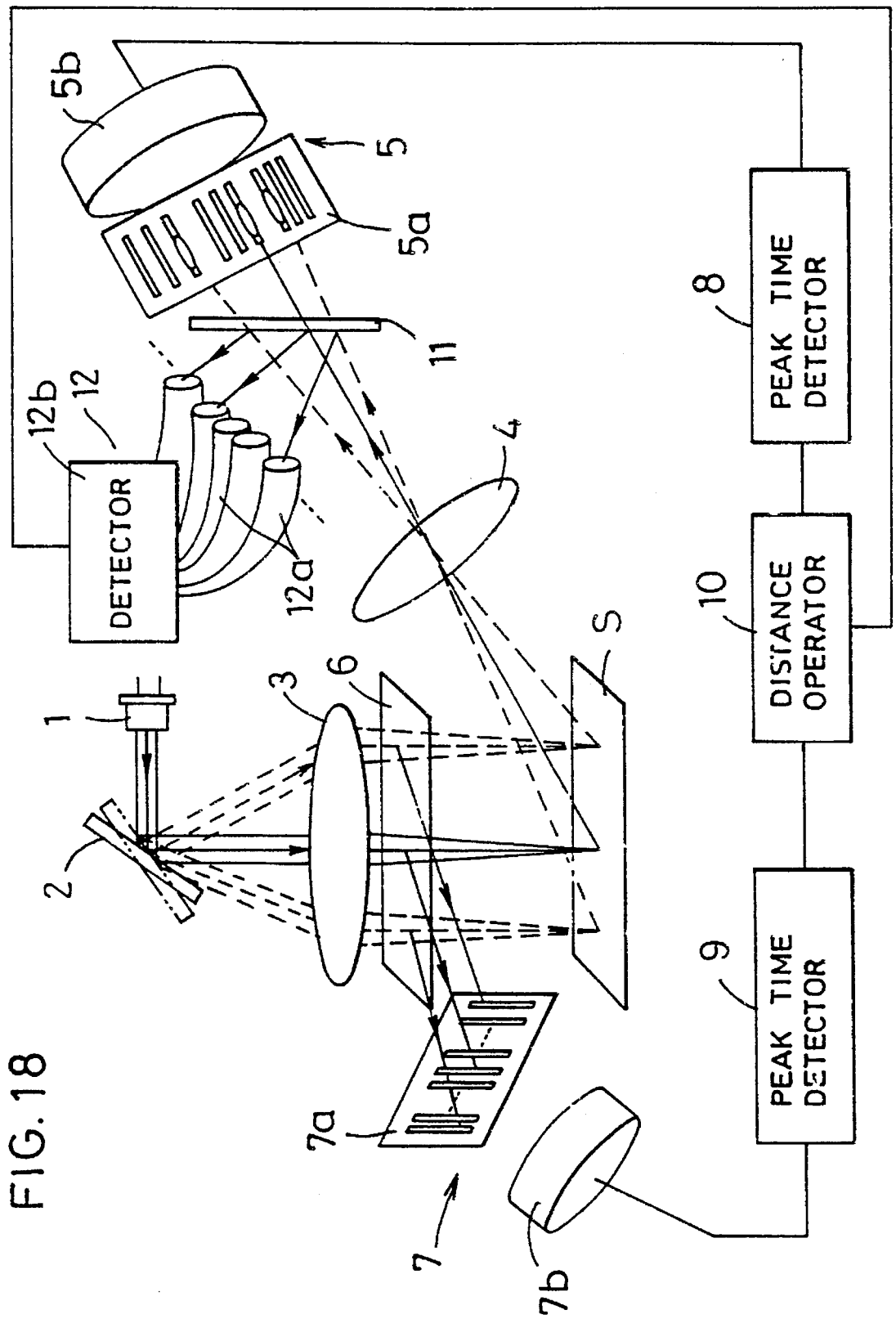
Figure 19:
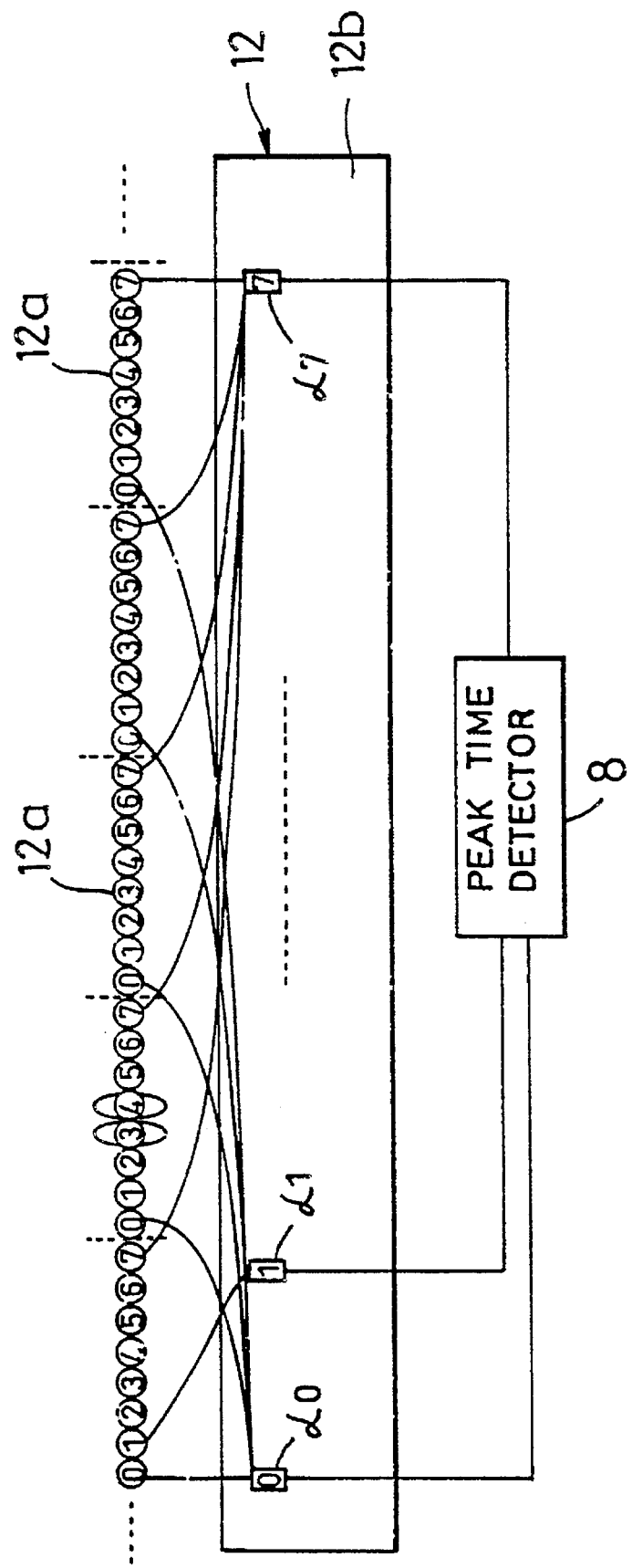
FIG. 19 is a schematic diagram showing a detector employed in the embodiment of FIG. 18.

In the present embodiment, as shown in FIG. 18, a beam splitter 11 comprising a half-mirror is disposed between the light receiving lens 4 and the slit plate 5a in the arrangement of Embodiment 5, so that the light passed through the light receiving lens 4 is bifurcated by the beam splitter 11 to be led into a separately provided detector 12. Here, the detector 12 comprises a plurality of optical fibers 12a arranged at one end surfaces along moving direction of the image of a spot of the bifurcated light from the beam splitter 11 and a plurality of photosensors 12b coupled to the other end surfaces of these optical fibers 12a. With this detector 12, as shown in FIG. 19, the optical fibers 12a are provided with the discriminators circulated in the direction in which the one end surfaces of the fibers are arranged, and the other end surfaces of the optical fibers 12a provided with the same discriminator are bundled and optically coupled to one of photosensor elements α0 to α7. That is, provided that eight discriminators from 0 to 7 are provided to the optical fibers 12a, eight photosensor elements α0 to α7 of the same number as that of the discriminators are provided as the photosensors 12b, and the optical fibers 12a of the respective discriminators are optically coupled to corresponding one of the photosensor elements α0 to α7. The arranging pitch of the respective optical fibers 12a is made to correspond one against one to the pitch of the slits provided in the slit plate 5a.

With the above arrangement, it is enabled to discriminate the displacement up to the one corresponding to eight times as large as the arranging pitch of the one end surfaces on light receiving side of the optical fibers 12a, and the number of the photosensor elements α0 to α7 can be reduced to a large extent as compared with the detector 5 in Embodiment 1 since the light is received collectively at the same photosensor elements α0 to α7 for every discriminator. Further, it is possible to obtain the same output as in the foregoing Embodiment 9 and so on, even when the photosensors Y1, Y2, . . . are disposed in place of the optical fibers 12a while providing to these photosensors Y1, Y2, . . . the circulating discriminators and mutually connecting the outputs of the photosensors Y1, Y2, . . . having the same discriminator. Other arrangement and operation are the same as those in the foregoing Embodiment 9.

Embodiment 11

Figure 20:
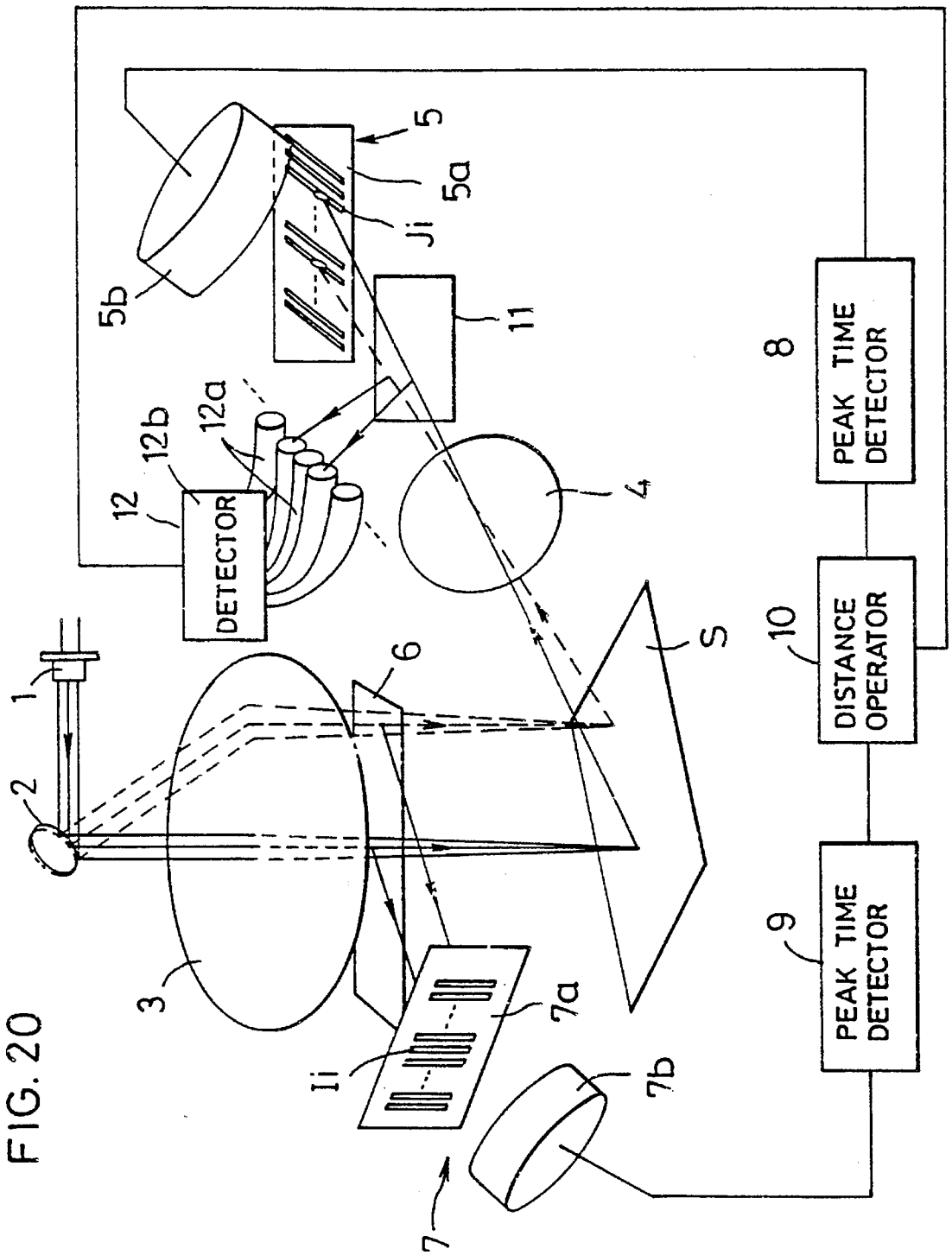
FIGS. 20 and 21 are schematic diagrams showing the entire arrangement of the device in further embodiments of the present invention.

In the present embodiment, as shown in FIG. 20, the beam splitter 11 and detector 12 employed in Embodiment 10 are applied to the arrangement of Embodiment 6. Other arrangement and operation are the same as those in the foregoing Embodiment 10.

Embodiment 12

The present embodiment is an alteration of the arrangement of the foregoing Embodiment 5 in which the light source 1 is modified. While, in the case where the light source 1 which outputs such light high in the interferenceness as the laser beam is employed, there is a risk that a speckle pattern arises in the image of a spot due to an irregular reflection on the surface of the subject in the arrangement of Embodiment 5 so as not to be able any accurate peak of the image of a spot. In the present embodiment, the problem of this kind can be eliminated by employing the light emission source 1a which irradiates a light of a low interferenceness.

Figure 21:
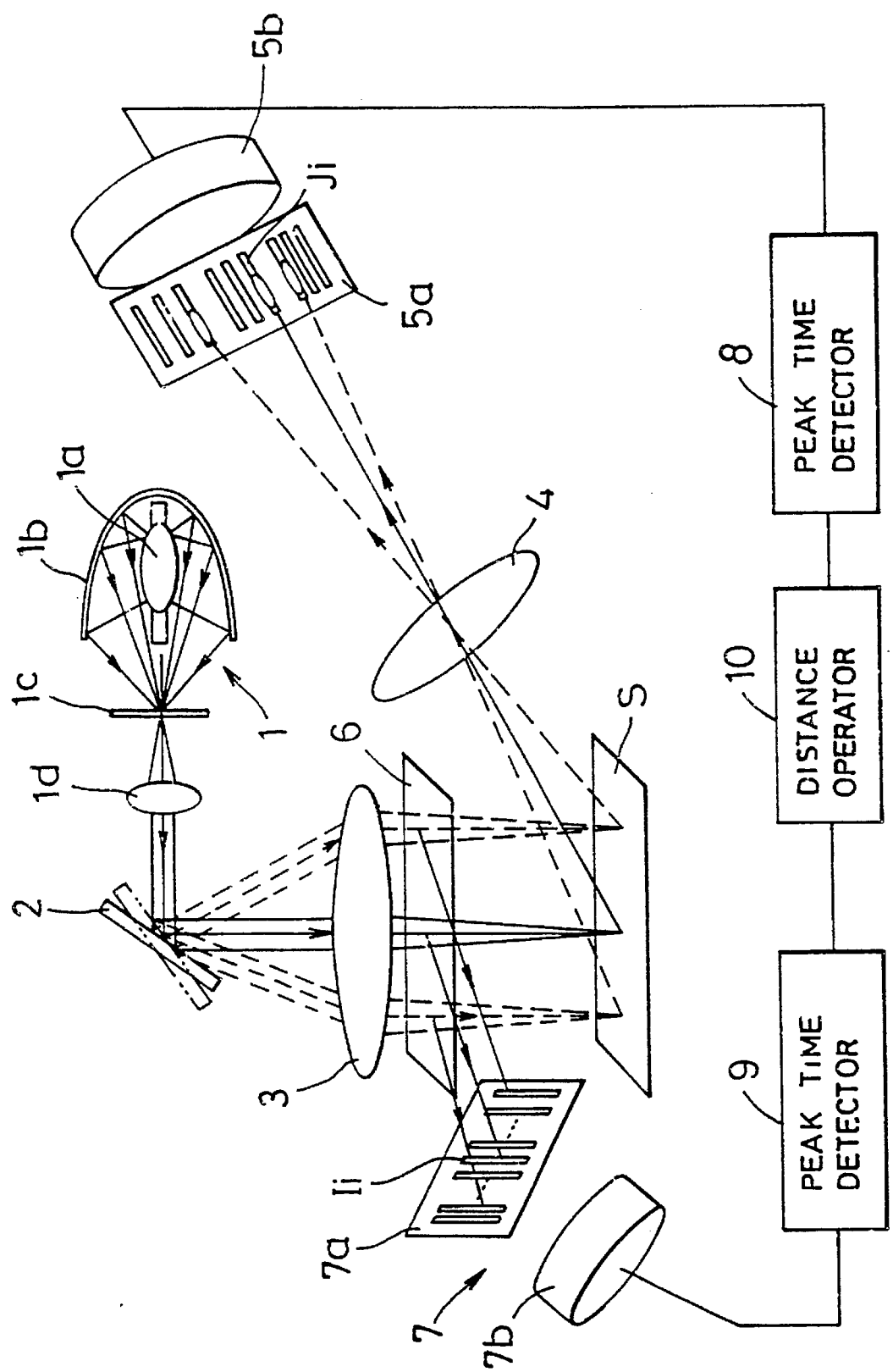

That is, as shown in FIG. 21, the light source 1 comprises such a light emission source 1a as a xenon lamp, superluminescent diode or the like, a reflection mirror 1b for reflecting and coverging emitted light from the source 1a, a pin-hole plate 1c having a pin hole and disposed adjacent to converging point of the beam from the light emission source 1a, and a collimating lens 1d for rendering the light passed through the pin-hole plate 1c to be a collimated beam. With such arrangement employed as the light source 1, it is made possible to provide a light of a low interferenceness and to prevent any speckle pattern from being formed in the formed-image spot. Other arrangement and operation are the same as those in the foregoing Embodiment 5.

In this case, as in the respective foregoing embodiments, the photodiode or photomultiplier is employed as the photosensor, it is made possible to remarkably shorten required take-in time as compared with a case employing CCD [the take-in time of CCD camera will be 33 msec×(1 picture sight)/(slit beam width)], and a required time for measuring the displacement of the surface of the subject can be eventually shortened, as will be readily appreciated.

The present invention has been described by way of preferred embodiments to which it is not limited. The scope of the invention is set forth in the claims appended hereto.

What is claimed is:

1. A method for detecting a shape of an object with high resolution measurement of displacement of the surface of the object from a reference plane, comprising the steps of:

A) irradiating a spot of projected light beam on the surface of said object;

B) scanning said projected light spot in a fixed direction on the surface of the object;

C) detecting a position of an image of a spot which is an image of said projected light spot image-formed through a light receiving lens having an optical axis lying in a direction different from an irradiating direction of said projected light beam by means of a first detector including a plurality of first light detecting elements arranged in an array, a width of said first light detecting elements in the direction of said array of the elements being set to be less than a width of the image of a spot in the same direction;

D) obtaining a time difference between a first time when the image of a spot with respect to the object has reached any one of the first light detecting elements and a second time when the projected light beam has reached one of second light detecting elements of a second detector which is at a position of the projected light beam at the time when the image of a spot is made to reach said first light detecting element with respect to said reference plane set by said second light detecting elements with respect to the surface of the object to be detected; and E) converting said time difference into a displacement of said surface of the object with respect to said reference plane.

2. The method according to claim 1 wherein an optical axis of said light receiving lens is included in a plane formed by said projected light beam being scanned in the fixed direction on said surface of said subject.

3. The method according to claim 1 wherein an optical axis of said light receiving lens is included in a plane intersecting at right angles a plane formed by said projected light beam being scanned in the fixed direction on said surface of said subject and intersecting substantially at right angles the surface of the subject.

4. The method according to claim 1 wherein said projected light beam has a light intensity distribution of a single-hump shape including a single intensity peak, and said time difference is obtained between said first time when said light intensity peak of said image of a spot with respect to said subject passes through any one of said light detecting elements and said second time when the light intensity peak of the projected light beam passes through a position where the image of a spot is made to pass through the same light receiving element in respect of said predetermined reference plane.

5. The method according to claim 3 wherein said projected light beam has a light intensity distribution of a single-hump shape including a single intensity peak, and said time difference is obtained between said first time when said light intensity peak of said image of a spot with respect to said subject passes through any one of said light detecting elements and said second time when the light intensity peak of the projected light beam passes through a position where the image of a spot is made to pass through the same light receiving element in respect of said predetermined reference plane.

6. The method according to claim 1 wherein said light detecting elements are formed in an elongated shape, and said surface of said subject involves streaks lying in one direction, a direction in which said light detecting elements is elongated being made to intersect at right angles a longitudinal direction of an image of said streaks formed on an image plane of said light receiving lens.

7. A device for detecting a shape of an object with high resolution measurement of displacements of the surface of said object from a reference plane, the device comprising:

a light source projecting a light beam of a spot shape in a first direction, a deflection means for variably deflecting said projected light beam from said light source in a second direction towards said object to be detected to form a projected light spot on the surface of said object and to scan said projected light spot in a fixed scanning direction on the surface of the object, a first detector including a plurality of first light detecting elements arrayed in a direction following said scanning direction for detecting a position of an image spot of said projected light spot formed on the surface of the object with a predetermined width in the scanning direction and reflected therefrom through a light receiving lens having an optical axis lying in a third direction included in a scanning plane of the projected light beam along the scanning direction, said first light detecting elements having respectively a width size in the arrayed direction of the elements set to be less than said width of said image spot, a second detector including the same number of second light detecting elements as said first light detecting elements and arrayed in a direction following said scanning direction for detecting scanning position of the projected light beam towards the object to be detected, said second light detecting elements of said second detector having respectively a width in said arrayed direction of the elements set to be less than said predetermined width of said projected light beam, said arrayed direction of second light detecting elements defining said reference plane with respect to the surface of the object to be detected, and a distance operator for operating a time difference between a first time when the image spot from the object reaches any one of said first light detecting elements of said first detector and a second time when the projected light beam reaches one of said second light detecting elements of said second detector at a position of the projected light beam at the time when the image spot reaches said first light detecting element, and converting said time difference into a distance, that is, a displacement of the image spot on the surface of the object with respect to said reference plane.

8. The device according to claim 7 wherein said first and second detectors generate outputs responsive to received light intensity at said light detecting elements, said light source is arranged for providing said projected light beam with a light intensity distribution of a single-hump shape including a single peak of the light intensity, and said distance operator is constituted for obtaining said time difference between said first time when said peak of said light intensity of the image of a spot with respect to the subject passes through any one of the light detecting elements of the first detector and said second time when the peak of the light intensity of the projected light beam passes through one of the second light detecting elements of said second detector provided at a position of the projected light beam at the time when the peak of the light intensity of the image of a spot passes through said first light detecting element in respect of said reference plane.

9. The device according to claim 7 wherein said first and second detectors respectively comprise a plurality of photosensors as said light detecting elements individually.

10. The device according to claim 8 wherein said first and second detectors respectively comprise a plurality of photosensors as said light detecting elements individually.

11. The device according to claim 7 wherein said first and second detectors respectively comprise a slit plate having a plurality of slits arranged on a straight line as said light detecting elements, and a photosensor generating outputs responsive to the intensity of light passed through said slit plate.

12. The device according to claim 8 wherein said first and second detectors respectively comprise a slit plate having a plurality of slits arranged on a straight line as said light detecting elements, and a photosensor generating outputs responsive to the intensity of light passed through said slit plate.

13. The device according to claim 8 wherein said light receiving lens is disposed to have its optical axis included in a plane intersecting at right angles a plane formed by said projected light beam upon said scanning of said projected light spot in said fixed direction on said surface of said subject and intersecting substantially at right angles the surface of the subject, and said slits of said first detector are slanted in their longitudinal direction with respect to a direction intersecting at right angles a moving direction of said image of a spot accompanying the scanning of the projected light spot in an image plane of the light receiving lens.

14. The device according to claim 12 wherein said photosensor is provided one against one for each of said slit plates.

15. The device according to claim 12 wherein a plurality of said photosensors are provided to correspond one against one to each of said slits in each said slit plate, and said outputs are provided by each of said photosensors.

16. The device according to claim 12 wherein a plurality of said photosensors are provided to correspond one against one to each of said slits in each said slit plate, said photosensors are provided with discriminators circulating for every fixed number in a direction of said arrangement, and the photosensors provided with the same discriminator are collected to every group providing each output.

17. The device according to claim 14 which further comprises a beam splitter disposed between said light receiving lens and said first detector for bifurcating a beam passing through the light receiving lens, and a third detector for detecting a position by bifurcated beam through said beam splitter, said third detector comprising a photosensor having a plurality of light receiving surfaces arranged along moving direction of an image of a spot of the bifurcated beam, said light receiving surfaces being provided with discriminators circulating for every fixed number, the photosensor being disposed for obtaining each of the outputs with every group of the light receiving surfaces of the same discriminator.

18. The device according to claim 7 wherein said light source projects said projected light beam of a low interferenceness.

19. The device according to claim 11 wherein said slits of said slit plate of said first detector have a shape conforming to the horizontal section of said projected light beam.

* * * * *